United States Patent
Kim et al.

(10) Patent No.: US 11,412,467 B2
(45) Date of Patent: Aug. 9, 2022

(54) METHOD AND DEVICE FOR CONTROLLING RECEIVING WINDOW FOR SIDELINK SIGNAL

(71) Applicant: LG ELECTRONICS INC., Seoul (KR)

(72) Inventors: Heejin Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 16/762,771

(22) PCT Filed: Nov. 9, 2018

(86) PCT No.: PCT/KR2018/013619
§ 371 (c)(1),
(2) Date: May 8, 2020

(87) PCT Pub. No.: WO2019/093816
PCT Pub. Date: May 16, 2019

(65) Prior Publication Data
US 2020/0367185 A1    Nov. 19, 2020

Related U.S. Application Data

(60) Provisional application No. 62/584,594, filed on Nov. 10, 2017.

(30) Foreign Application Priority Data

Sep. 28, 2018    (KR) .................. 10-2018-0116353

(51) Int. Cl.
*H04W 4/00* (2018.01)
*H04W 56/00* (2009.01)
(Continued)

(52) U.S. Cl.
CPC ....... *H04W 56/001* (2013.01); *H04L 27/2607* (2013.01); *H04L 27/2636* (2013.01); *H04W 72/0446* (2013.01); *H04W 92/18* (2013.01)

(58) Field of Classification Search
None
See application file for complete search history.

(56) References Cited

U.S. PATENT DOCUMENTS

| 11,265,940 B2 * | 3/2022 | Su | H04W 76/14 |
| 2009/0082002 A1 * | 3/2009 | Kim | H04W 48/12 455/418 |

(Continued)

FOREIGN PATENT DOCUMENTS

| EP | 3026456 | 6/2016 |
| KR | 20160018353 | 2/2016 |

OTHER PUBLICATIONS

PCT International Application No. PCT/KR2018/013619, International Search Report dated Feb. 14, 2019, 4 pages.

*Primary Examiner* — Gerald A Smarth
(74) *Attorney, Agent, or Firm* — Lee Hong Degerman Kang & Waimey

(57) ABSTRACT

Presented in the present specification is a method for a receiving terminal supporting a sidelink. The receiving terminal according to the present specification acquires a synchronization for setting a symbol boundary, applies the same symbol boundary for a plurality of receiving signals, and can set a receiving window on the basis of the symbol boundary. The receiving terminal can acquire a propagation delay applied to a plurality of wireless signals through a first wireless signal among the plurality of wireless signals, and can adjust a starting time of the receiving window for decoding a second wireless signal through the propagation delay or can feed back information related to a transmission timing to a transmission device for transmitting the second (Continued)

wireless signal. Therefore, an efficient decoding technique for a second wireless signal having a characteristic newer than that of a conventional technique is presented.

14 Claims, 20 Drawing Sheets

(51) Int. Cl.
*H04L 27/26* (2006.01)
*H04W 72/04* (2009.01)
*H04W 92/18* (2009.01)

(56) References Cited

U.S. PATENT DOCUMENTS

| | | |
|---|---|---|
| 2011/0149943 A1 | 6/2011 | Srinivasan et al. |
| 2015/0327180 A1* | 11/2015 | Ryu .................... H04W 52/383 |
| | | 370/329 |
| 2016/0044666 A1* | 2/2016 | Shin .................... H04W 56/002 |
| | | 370/336 |
| 2016/0128082 A1 | 5/2016 | Chen et al. |
| 2017/0079026 A1 | 3/2017 | Li et al. |
| 2017/0187558 A1* | 6/2017 | Yasukawa .............. H04J 11/005 |
| 2019/0141755 A1* | 5/2019 | Bai ....................... H04L 5/0048 |

* cited by examiner

FIG. 8
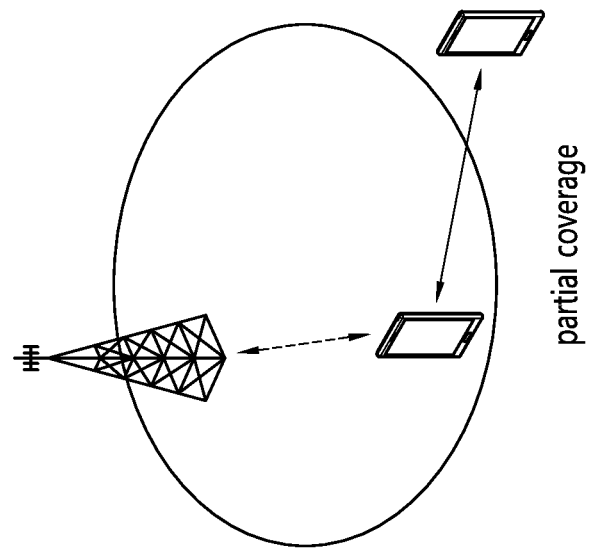
partial coverage
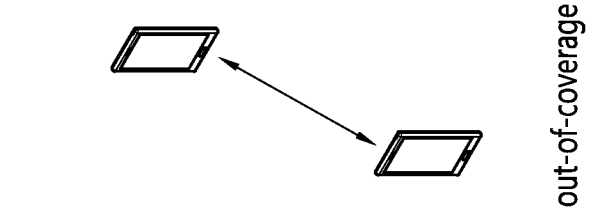
out-of-coverage
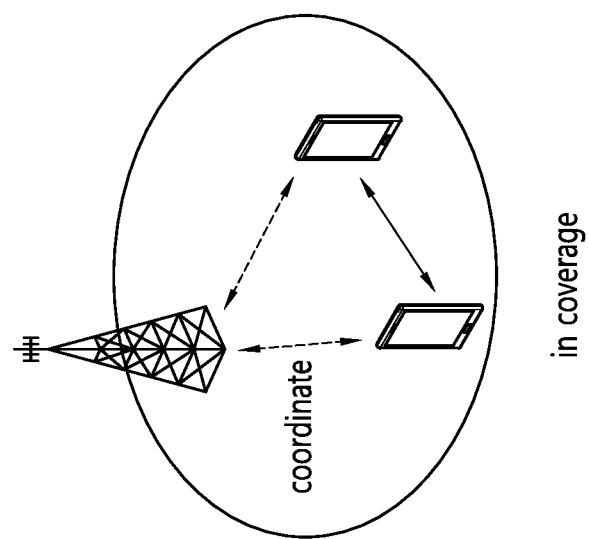
in coverage

METHOD AND DEVICE FOR CONTROLLING RECEIVING WINDOW FOR SIDELINK SIGNAL

CROSS-REFERENCE TO RELATED APPLICATIONS

This application is the National Stage filing under 35 U.S.C. 371 of International Application No. PCT/KR2018/013619, filed on Nov. 9, 2018, which claims the benefit of earlier filing date and right of priority to U.S. Provisional Application No. 62/584,594, filed on Nov. 10, 2017, and also claims the benefit of Korean Application No. 10-2018-0116353, filed on Sep. 28, 2018, the contents of which are all hereby incorporated by reference herein in their entireties.

BACKGROUND

Technical Field

The present disclosure relates to a wireless communication system supporting a sidelink, and, more specifically, to a method and device regarding an improved communication technique for controlling a receiver window to process a wireless signal used on a sidelink when the wireless signal is delayed.

Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced (LTE-A) is one of promising candidates for the IMT-advanced.

Meanwhile, recently, there is a growing increase in a sidelink or device-to-device (D2D) technique for performing direct communication between devices. In particular, the sidelink or D2D is drawing attention as a communication technique for a public safety network. Although a commercial communication network is rapidly changing to LTE, the public safety network is primarily based on a 2G technique at present in terms of costs and a problem of a collision with the conventional communication protocol. Such a technical gap and a demand on an improved service results in an effort of improving the public safety network.

The public safety network has a higher service requirement (reliability and safety) in comparison with the commercial communication network, and in particular, even if cellular communication is performed in an out-of-coverage state or is not available, also demands direct signal transmission/reception between devices, i.e., a sidelink (or D2D) operation.

The sidelink (or D2D) operation may have various advantages in a sense that it is signal transmission/reception between proximate devices. For example, a D2D user equipment (UE) may perform data communication with a high transfer rate and a low delay. Further, the D2D operation may distribute traffic concentrated on a base station, and may have a role of extending coverage of the base station if the D2D UE plays a role of a relay.

The aforementioned sidelink (or D2D) communication may be extended to apply to signal transmission/reception between vehicles, and communication related to the vehicle is particularly called vehicle-to-everything (V2X) communication.

In the V2X, the term 'X' may be a pedestrian, a vehicle, or an infrastructure/network, which may be indicated respectively by V2P, V2V, or V2I/N.

SUMMARY

When a receiving UE receives a wireless signal through a sidelink, various problems may occur when decoding is performed using a related art receiver window. For example, if there is one transmitting UE and a size of propagation delay due to a distance between the transmitting UE and the receiving UE is greater than a length of a cyclic prefix (CP) applied/included in the received wireless signal, various problems may occur. For example, if there is one transmitting UE/receiving UE and the size of propagation delay is greater than the length of the CP, decoding may be difficult if a single receiver window is used without improving a start time of the receiver window. Accordingly, an example of the present specification, which will be described later, may improve decoding performance by efficiently determining a start time of a receiver window or efficiently determining the number of receiver windows.

In addition, even when the receiving UE receives a plurality of wireless signals having different characteristics (e.g., different neurology, subcarrier spacing, CP length, length of time unit, and/or frequency band as described in an example of the present specification described later), there may be a problem for the receiving UE to decode all signals using the receiver window according to the related art. For example, even if the same delay or error occurs for a plurality of wireless signals, it may not be possible to perform normal decoding based on the related art receiver window because lengths of symbols or CPs included in the corresponding signals may be different.

An example of the present specification proposes a technique for decoding a plurality of wireless signals (or radio signals) having different characteristics (specifically, different numerology, subcarrier spacing, CP length, length of time unit, and/or frequency band). For example, a plurality of wireless signals may have different CP lengths, may be received in different frequency bands, or may be configured in different channels. For example, a first wireless signal among a plurality of wireless signals may be received in a low frequency band and include a relatively long CP, and a second wireless signal may be received in a high frequency band and include a relatively short CR In this case, when the same symbol boundary is applied to the first and second wireless signals and decoding is performed through the same receiver window, it may be difficult to perform normal decoding on the second wireless signal.

To this end, an example of the present specification proposes a method and device for supporting improved decoding for first and second wireless signals. For example, an example of the present specification includes a method for a user equipment (UE) to receive a signal through a sidelink. The method includes obtaining synchronization for the sidelink at a receiving UE. In addition, the method, the receiving UE includes receiving the first wireless signal and the second wireless signal through the sidelink by the receiving UE, wherein the first wireless signal may include a first cyclic prefix (CP) and the second wireless signal may include a second CP. In addition, the method may include, by the receiving UE, setting a start point of a receiver window for decoding the second wireless signal based on the first wireless signal. Further, the method may include, by the receiving UE, decoding the second wireless signal based on the receiver window.

An example of the present specification proposes a method of setting a receiver window for another wireless signal based on a wireless signal having a specific attribute (e.g., a wireless signal having a low frequency band or a long CP). Through this, normal decoding may be performed although a length of a CP is set to be short in a high-band signal.

BRIEF DESCRIPTION OF THE DRAWINGS

FIG. 8 is a diagram illustrating an example of a scenario in which a sidelink is applied.

DESCRIPTION OF EXEMPLARY EMBODIMENTS

Technical features described below may be used in a communication standard by the $3^{rd}$ generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system include LTE-advanced (LTE-A), LTE-A Pro, and/or a 5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

Figure 1:
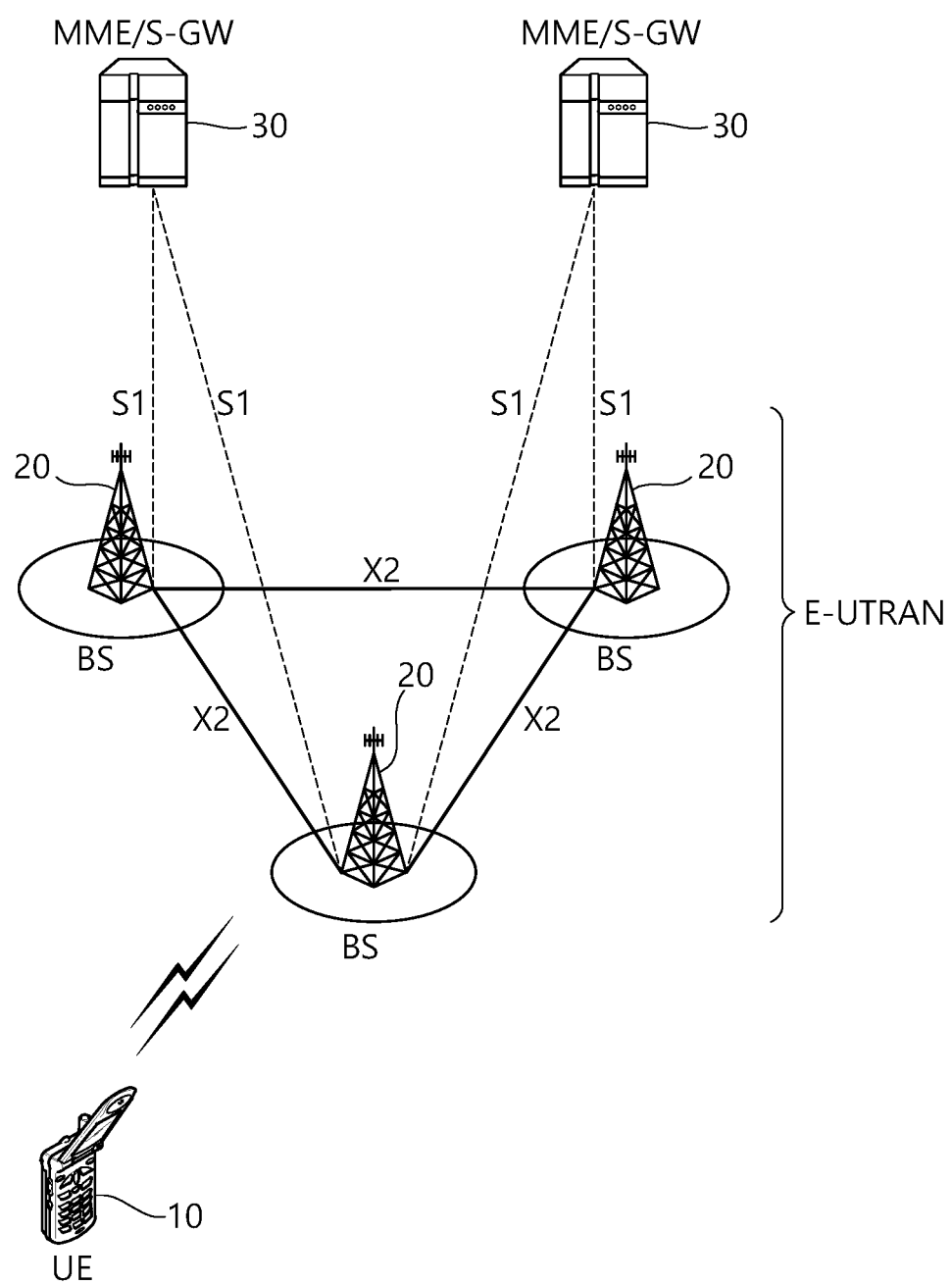
FIG. 1 shows an example of a wireless communication system to which the technical features of the present specification may be applied.

FIG. 1 shows an example of a wireless communication system to which a technical feature of the present specification is applicable. Specifically, FIG. 1 is an example based on an evolved-universal terrestrial radio access network (E-UTRAN). The aforementioned LTE is part of evolved-UMTS (E-UMTS) using the E-UTRAN.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
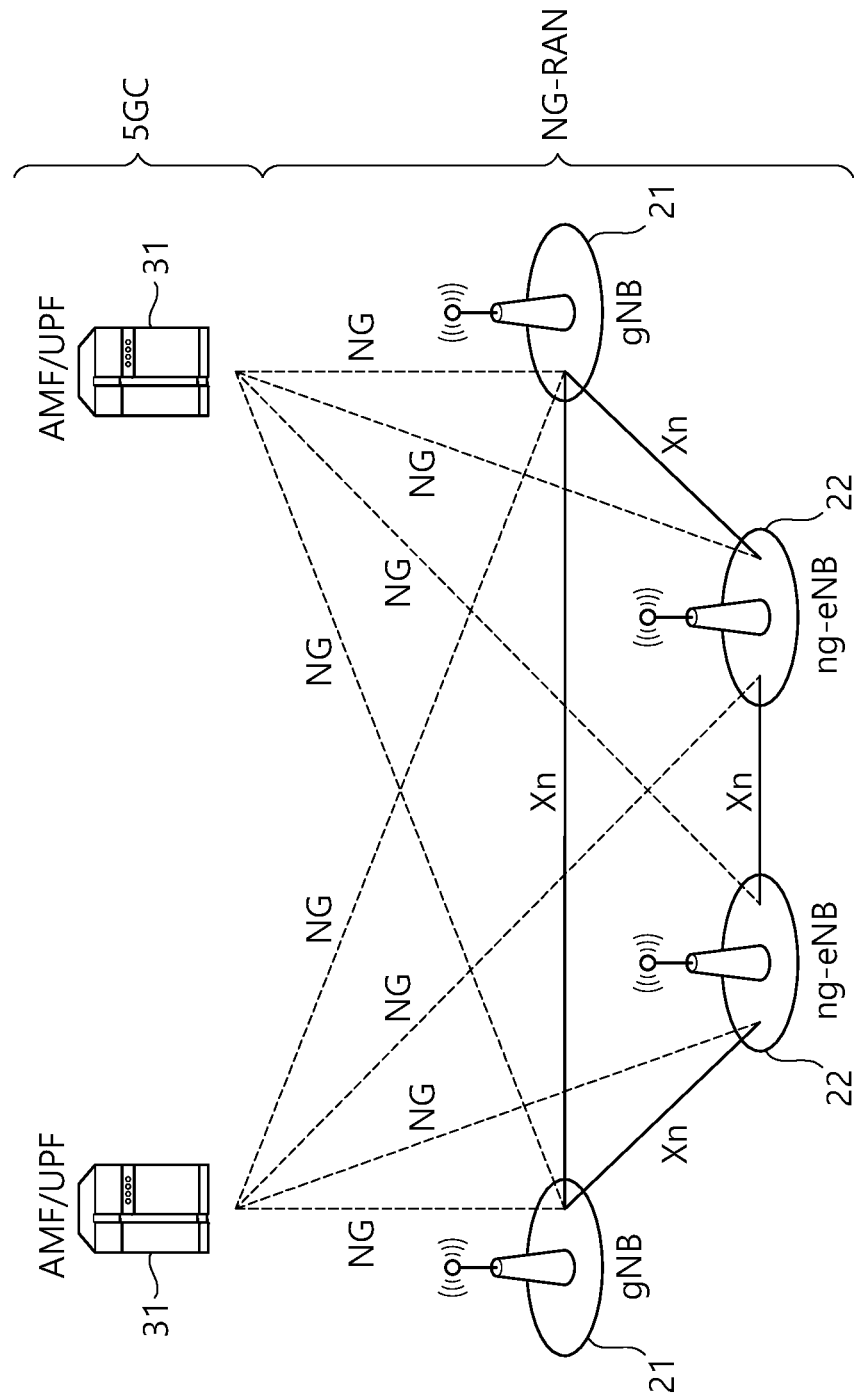
FIG. 2 shows another example of a wireless communication system to which the technical features of the present specification may be applied.

FIG. 2 shows another example of a wireless communication system to which a technical feature of the present specification is applicable. Specifically, FIG. 2 is an example in which a 5G new radio (NR) standard is utilized. A communication entity used in the 5G NR standard (hereinafter, "NR" standard) incorporates all or some functions of the entity (eNB, MME, S-GW) introduced in FIG. 1, and may be identified as a name "NG" or "ng" so as to be distinguished from the conventional standard.

The system of FIG. 2 includes a next generation-radio access network (NG-RAN) communicating with a user equipment (UE). NG-RANs 21 and 22 are entities corresponding to a BS, and include a gNB 21 or an ng-eNB 22. A network interface called an Xn interface is defined between the NG-RANs 21 and 22. The gNB 21 provides an NR user plane and control plane for the UE, and is connected to a 5G core network (5GC) via the NG interface of FIG. 2. The Ng-eNB 22 is an entity for providing a user plane and control plane based on evolved-universal terrestrial radio access (UTRA), and is connected to the 5GC via the NG interface.

An access and mobility management function (AMF) is an entity including a function of the conventional MME, and communicates with the NG-RANs 21 and 22 via an NG-C interface. The NG-C interface is a control plane interface between the NG-RAN and the AMF.

A user plane function (UPF) is an entity including a function of the conventional S-GW, and communicates with the NG-RANs 21 and 22 via an NG-U interface. The NG-U interface is a user plane interface between the NG-RAN and the AMF.

On the system of FIG. 1 and/or FIG. 2, layers of a radio interface protocol between the network (NG-RAN and/or E-UTRAN) and the UE may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and a BS.

Hereinafter, a structure of a radio frame transmitted/received through a physical channel will be described.

In the LTE standard (and the evolution of the LTE standard), one radio frame consists of 10 subframes in a time domain, and one subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

Unlike the LTE standard, the NR standard supports various numerologies, and thus a radio frame is configured in various structures. In the NR standard, a plurality of sub-carrier spacings are supported on a frequency domain. A numerology of the NR is determined by a numerology in use. The plurality of numerologies supported in the NR are shown in Table 1 below. Each numerology is identified by an index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, a subcarrier spacing may be determined as one of 15, 30, 60, 120, and 240 kHz. However, since a specific numeral value is changeable, each spacing (e.g., $\mu=0, 1 \ldots 4$) may be indicated by $1^{st}$ and $2^{nd}$ to $5^{th}$ subcarrier spacings (i.e., N subcarrier spacings). As shown in Table 1, it may not be used to transmit user data (e.g., physical uplink shared channel (PUSCH), physical downlink shared channel (PDSCH), etc.) based on a subcarrier spacing. That is, user data transmission may not be supported only in predetermined at least one subcarrier spacing (e.g., 240 kHz).

In addition, as shown in Table 1, a synchronization channel (e.g., primary synchronization signal (PSS), secondary synchronization signal (SSS), physical broadcast channel (PBCH), etc.) may not be supported based on the subcarrier spacing. That is, the synchronization channel may not be supported only in specific at least one subcarrier spacing (e.g., 60 kHz).

In the NR standard, the number of slots and the number of symbols to be included may be set differently based on various numerologies, i.e., various subcarrier spacings. A specific example thereof may be as shown in Table 2 below.

TABLE 2

| $\mu$ | The number of symbols in slot | The number of slots in radio frame | The number of slots in subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Based on Table 2, when a first numerology with "$\mu=0$" is applied, one radio frame includes 10 subframes, one subframe corresponds to 1 slot, and 1 slot includes 14 symbols. In the present specification, a 'symbol' means a signal transferred for a specific time duration, and for example, may mean a signal generated by orthogonal frequency division multiplexing (OFDM) processing. That is, a symbol of the present specification may mean an OFDM/OFDMA symbol or an SC-FDMA symbol or the like. A cyclic prefix (CP) may be located between the symbols. An example of Table 2 may be an example to be applied to a normal CP.

Figure 3:
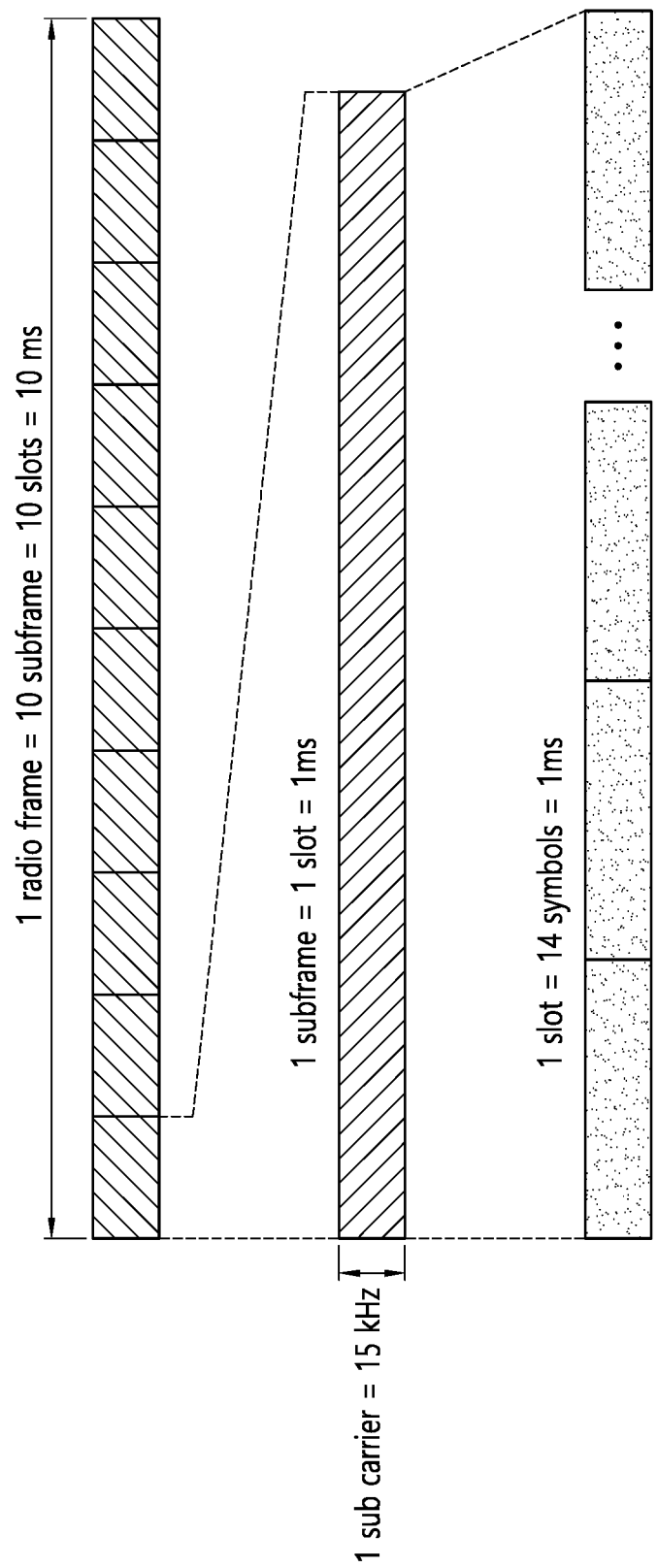
FIG. 3 shows an example in which a specific numerology is applied.

FIG. 3 shows an example to which a specific numerology is applied. That is, FIG. 3 shows a case of $\mu=0$.

Figure 4:
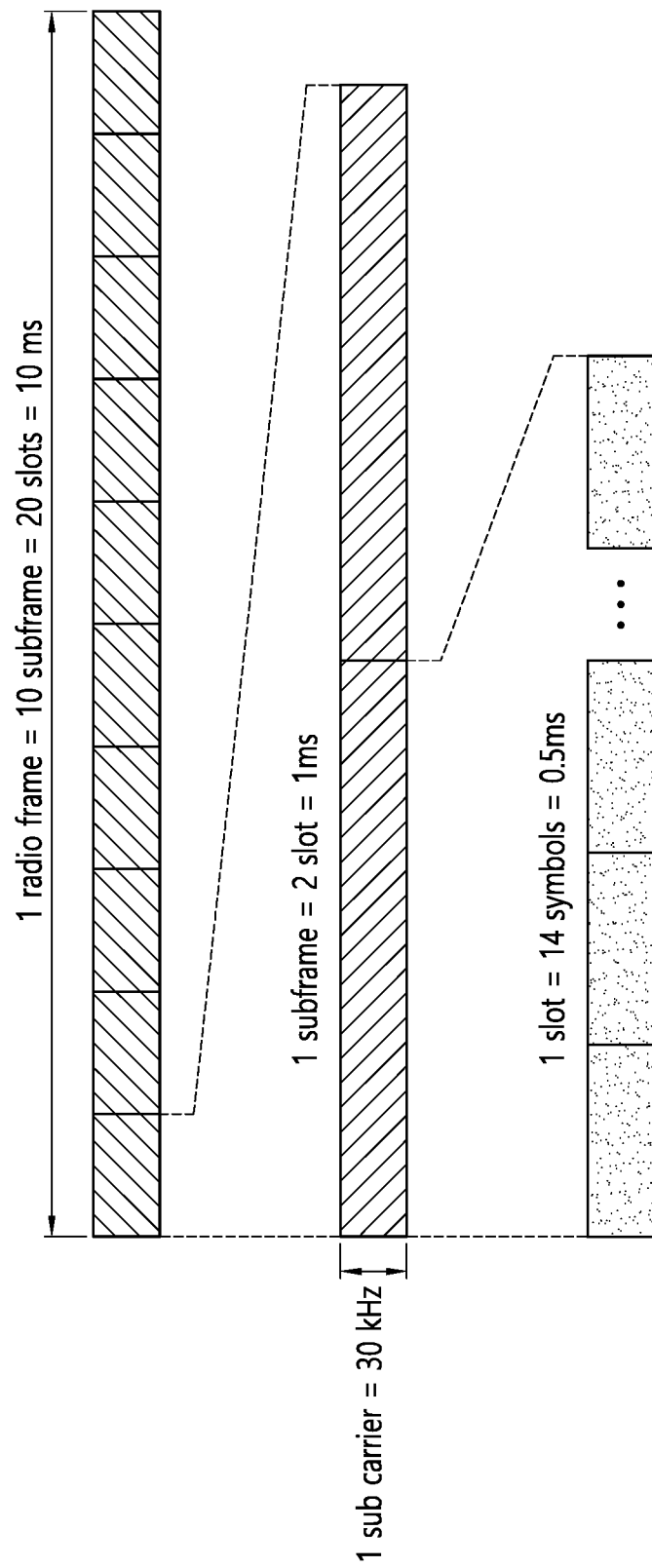
FIG. 4 shows an example in which another numerology is applied.

FIG. 4 shows an example to which another numerology is applied. That is, FIG. 4 shows a case of $\mu=1$.

Meanwhile, frequency division duplex (FDD) and/or time division duplex (TDD) may be applied in a wireless system to which an example of the present specification is applied. When TDD is applied, uplink and downlink subframes are allocated on a subframe basis in an LTE system.

In case of an NR standard/system, each symbol may be divided into downlink (indicated by D), flexible (indicated by X) and uplink (indicated by U). The content of the following table may be applied commonly to a specific cell, or may be applied commonly to adjacent cells, or may be applied individually or differently for each UE.

TABLE 3

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

For convenience of explanation, Table 3 shows only part of a format (e.g., TDD format) defined in the actual NR standard. A specific allocation scheme may be changed or added. A UE may have a slot format (i.e., TDD format) configured through a higher layer signal, may have a slot format configured through downlink control information (DCI) transmitted through a physical downlink control channel (PDCCH), or may have a slot format configured through a combination of a higher layer signal (RRC signal) and DCI.

Figure 5:
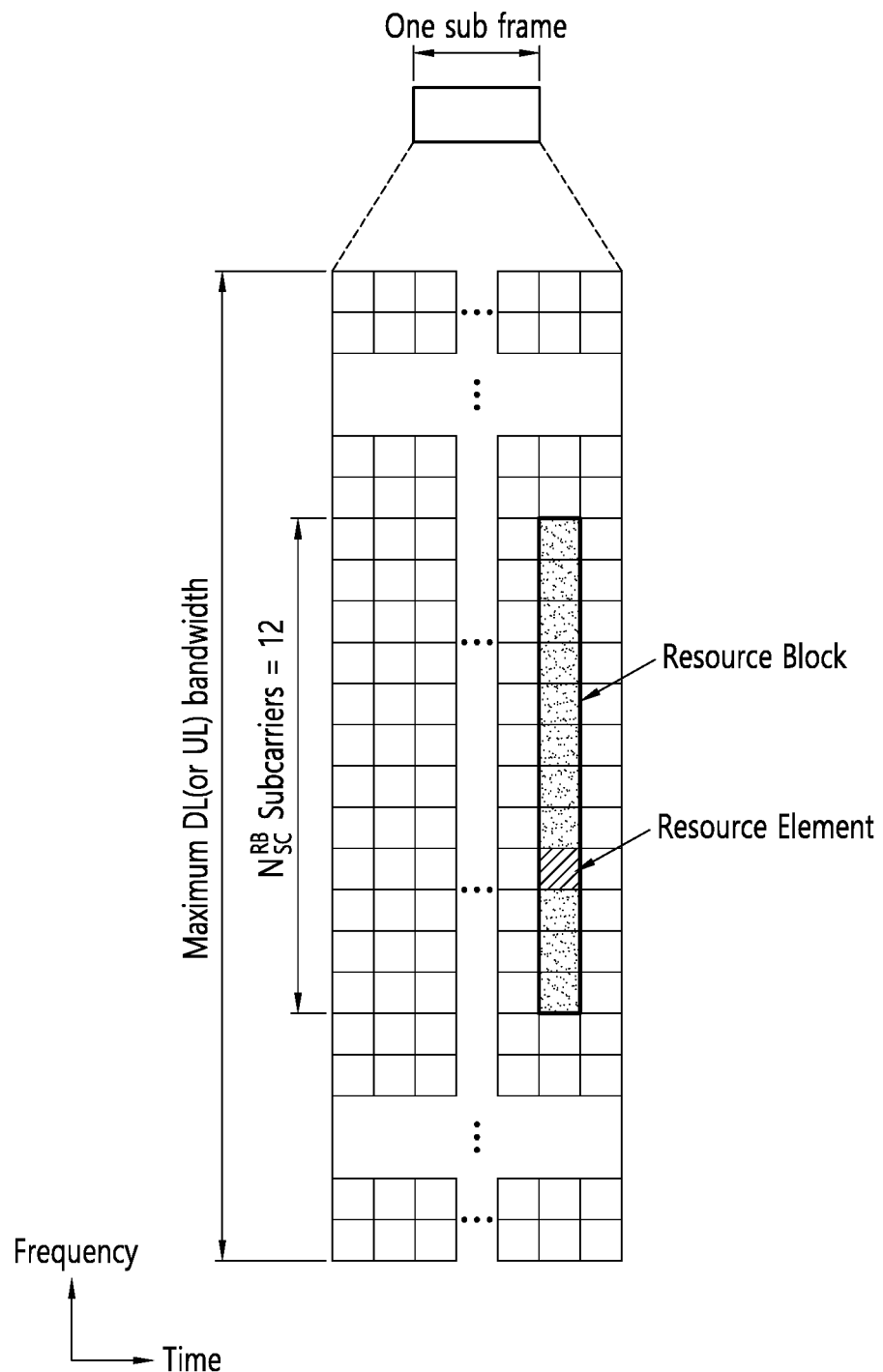
FIG. 5 is a diagram showing an example of a resource grid.

FIG. 5 is a drawing showing an example of a resource grid. The example of FIG. 5 is a time-frequency resource grid used in the NR standard. The example of FIG. 5 may be applied to uplink and/or downlink. As illustrated, a plurality of slots are included on a time axis in one subframe. Specifically, when expressed based on a value "$\mu$", "$14 \times 2\mu$" symbols may be expressed in a resource grid. In addition, as illustrated, one resource block (RB) may occupy 12 contiguous subcarriers. One RB may be called a physical RB (PRB), and 12 resource elements (REs) may be included in each PRB. The number of RBs that may be allocated may be determined based on a minimum value and a maximum value. In addition, the number of RBs that may be allocated may be individually set based on a numerology "$\mu$", and may be set to the same value or different values for uplink and downlink.

Hereinafter, a cell search scheme performed in the NR standard will be described. A UE may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 6:
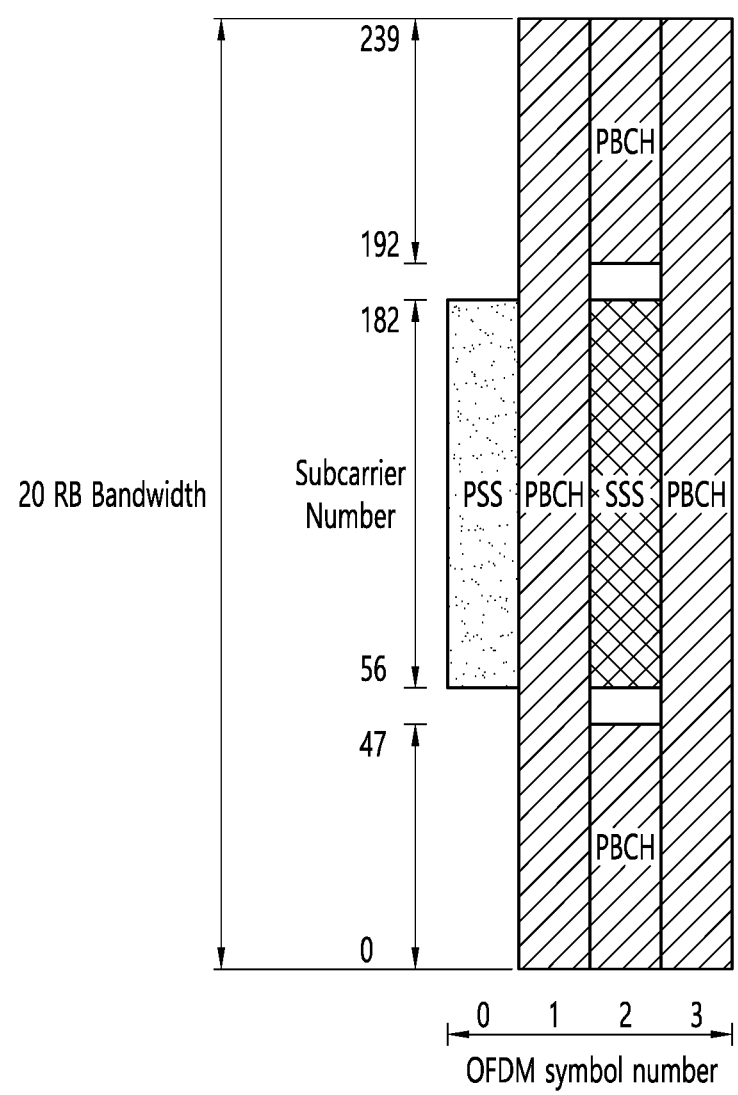
FIG. 6 shows an example of a synchronization channel applied to an example of the present specification.

FIG. 6 shows an example of a synchronization channel applied to an embodiment of the present specification. As illustrated, a PSS and an SSS may include one symbol and 127 subcarriers, and a PBCH may be transmitted through 3 symbols and may include 240 subcarriers.

The PSS is used to obtain synchronization signal/PBCH block (SSB) symbol timing, and indicates three hypotheses for identifying a cell ID. The SSS is used to identify the cell ID, and indicates 336 hypotheses. As a result, 1008 physical cell IDs may be configured through the PSS and the SSS.

The SSB block may be transmitted repeatedly based on a predetermined pattern within a 5 ms window. For example, when L SSB blocks are transmitted, all of SSB#1 to SSB#L include the same information, but may be transmitted through beams of different directions. That is, a quasi co-location (QCL) may not be applied for the SSB blocks within the 5 m window. A beam used to receive the SSB block may be used in a subsequent operation (e.g., a random access operation or the like) between a UE and a network. The SSB block may be repeated with a specific period. A repetition period may be determined individually based on a numerology.

As illustrated, the PBCH has a bandwidth of 20 RBs in $2^{nd}/4^{th}$ symbols, and has a bandwidth of 8 RBs in a $3^{rd}$ symbol. A DM-RS for decoding the PBCH is included in the PBCH. A frequency domain is determined in the DMRS based on a cell ID value. Unlike in the LTE standard, since a cell-specific RS (CRS) is not defined in NR, a specific DM-RS is defined for demodulation of the PBCH. A PBCH-DMRS may include information indicating an SSB index.

The PBCH performs various functions, and may perform a function of representatively broadcasting a master information block (MIB). By reference, system information (SI) is divided into minimum SI (MSI) and other SI (OSI). The minimum SI may be divided again into MIB and system information type1 (SIB1), and the remaining minimum SI except for the MIB may be called remaining minimum SI (RMSI).

The MIB includes information required to decode the SIB1. For example, the MIB includes the SIB1 (a message 2/4 used in the random access procedure, a subcarrier spacing applied to other system information (SI)), a frequency offset between the SSB and an RB transmitted later, a bandwidth of PDCCH/SIB, and information for decoding the PDCCH (e.g., information on search-space/CORESET/DM-RS or the like described below). The MIB may be transmitted periodically, and the same information may be transmitted repeatedly for a time duration of 80 ms. The SIB1 is transmitted repeatedly through the PDSCH, and includes control information for initial access of the UE and information for decoding a different SIB.

Hereinafter, a sidelink or D2D operation to which an example of the present specification is applied will be described.

Figure 7:
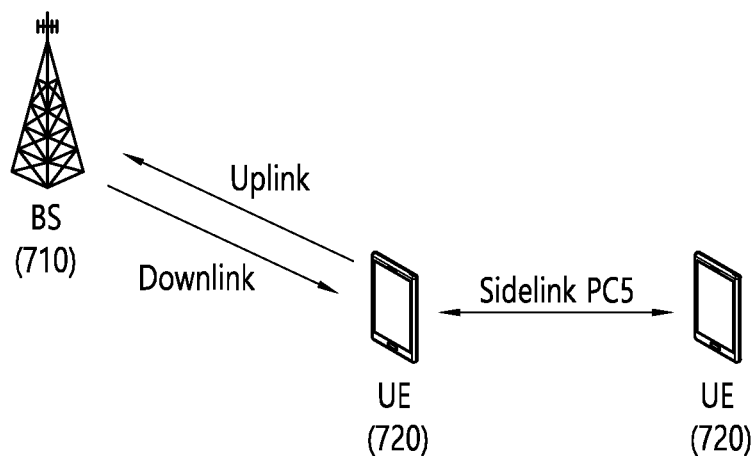
FIG. 7 is a diagram regarding a structure of a sidelink to which an example of the present specification is applied.

FIG. 7 is a drawing for a structure of sidelink to which an example of the present specification is applied. As illustrated, uplink (UL) and downlink (DL) may be defined between a BS 710 and a UE 720. In addition, sidelink (SL) is defined between the UEs 720. The SL corresponds to a PC5 interface defined on the 3GPP standard. For example, a resource allocated to the SL may be selected from UL resources. Specifically, a subframe (or a time resource such as a slot or the like) on a UL frequency through FDD or a subframe (or a time resource such as a slot or the like) allocated on UL through TDD may be allocated.

The term "ProSe communication" may be used in the same concept as the SL. In general, the ProSe means an end-to-end application. The SL may mean a channel structure. Specifically, a structure for a physical/transport/logical channel or the like used for an air-interface to realize the ProSe application is described in general in the concept as the SL.

FIG. 8 is a drawing showing an example of a scenario to which sidelink is applied. As illustrated, sidelink (SL) or Prose communication may be divided into three scenarios. First, in an in-coverage scenario, a network (e.g., BS) may allocate a specific resource for sidelink (or Pro Se) to a transmitting UE, or may allocate a resource pool (RP) that may be used by the transmitting UE. Second, an out-of-coverage scenario is a case where a network-based control is impossible. The transmitting UE may perform SL communication through a predetermined resource (e.g., a resource predetermined through USIM or UICC card or the like). Even in case of an out-of-coverage scenario, it may be an in-coverage situation for normal cellular traffic, and there may be no coverage only for ProSe communication. Finally, in a partial coverage scenario, an in-coverage UE and an out-of-coverage UE co-exist. Specifically, the out-of-coverage UE may use a predetermined resource, and the in-coverage UE may perform communication through a resource controlled by the network.

Figure 9:
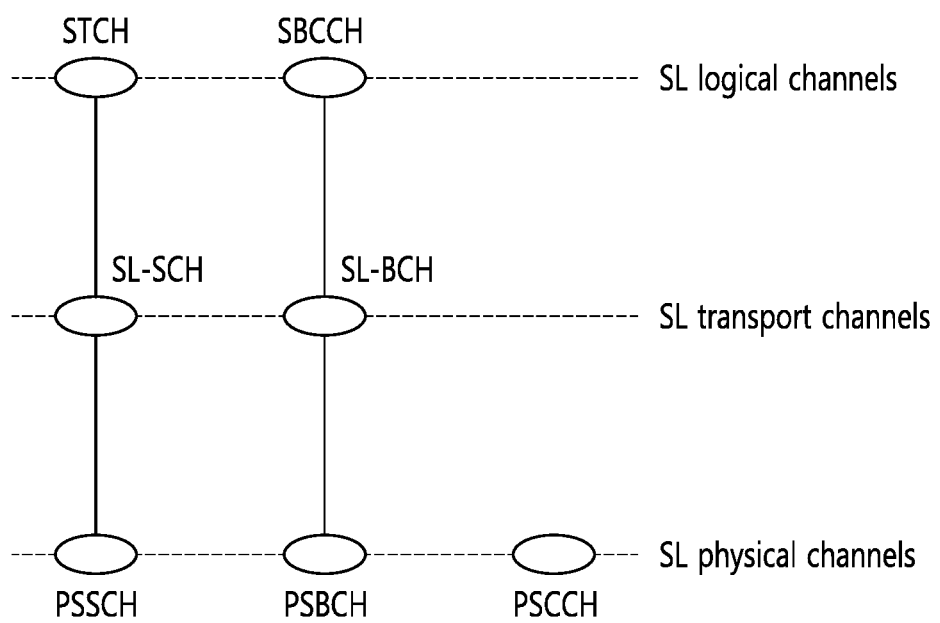
FIG. 9 is a diagram showing a mapping relationship between channels related to a sidelink.

FIG. 9 is a drawing showing a mapping relation between channels related to sidelink. A logical channel for the sidelink (SL) may be defined as an SL traffic channel (STCH) for a data path and an SL broadcast control channel (SBCCH) for control signaling. The STCH is used to transmit user information for a ProSe application, and is mapped to an SL shared channel (SL-SCH) and a physical DL shared channel (PSSCH). The SBCCH is used to transmit a control signal or the like for synchronization, and is mapped to an SL broadcast channel (SL-BCH) and a physical SL broadcast channel (PSBCH). A physical SL control channel (PSCCH) corresponds to a PDCCH of cellular communication. Specifically, the PSCCH is used to transmit sidelink control information (SCI) which is control information required to receive and demodulate the PSSCH. The SCI information is transmitted before an STCH data block is transmitted.

Figure 10:
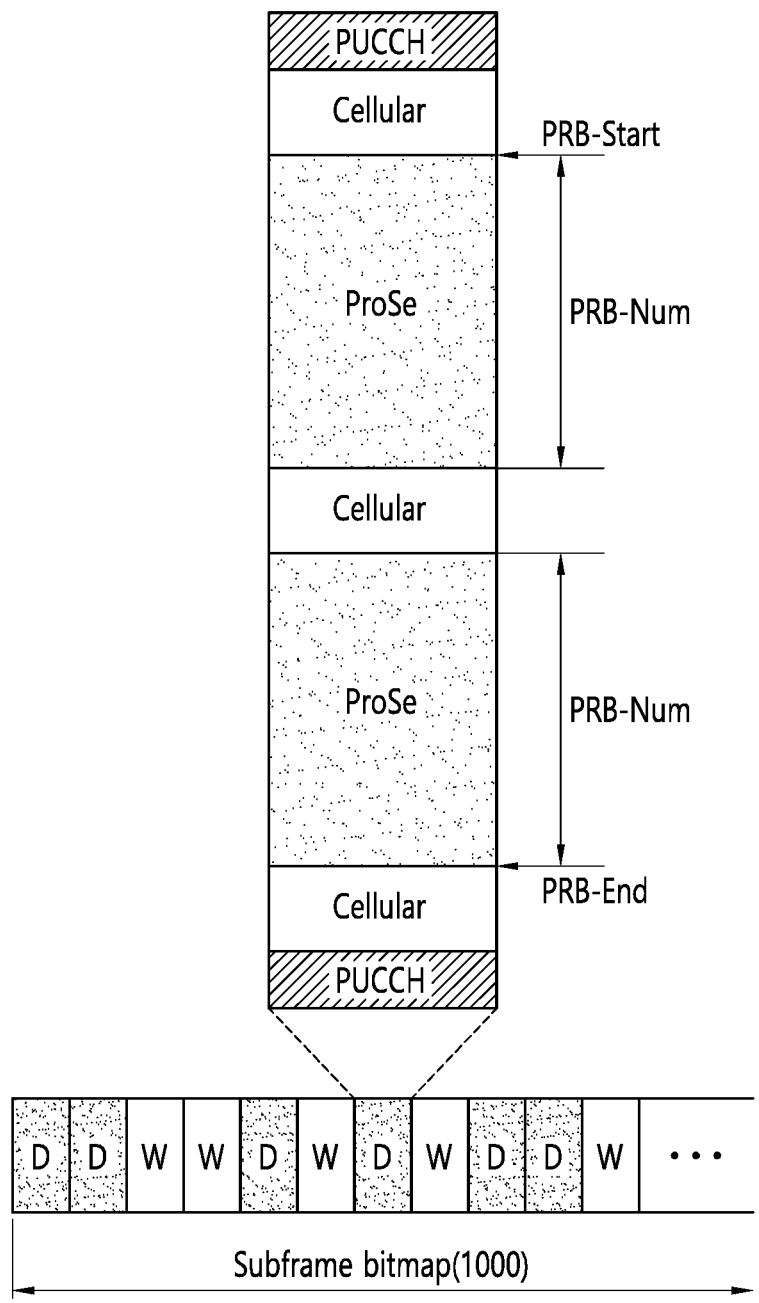
FIG. 10 shows an example of a resource pool for sidelink (SL) communication.

FIG. 10 shows an example of a resource pool for sidelink (SL) communication. The example of FIG. 10 shows an example in which a resource pool is configured on a subframe basis. However, the illustrated subframe may be replaced with another time unit (e.g., slot, symbol, or TTI). Based on the example of FIG. 10, whether a corresponding subframe is used for SL may be indicated depending on a subframe bitmap 1000. A pattern indicated depending on the subframe bitmap 1000 may be repeated.

Based on the example of FIG. 10, two frequency resources may be allocated for SL in one subframe, and each frequency resource may be indicated on a physical resource block (PRB) basis. Specifically, one frequency resource may start from PRB_start, and the other frequency resource may end at PRB_end. The number of PRBs occupied by each of the frequency resources may be PRB-Num. One UE is configured to use any one of a resource for sidelink/ProSe communication and a resource for cellular communication. A resource pool (RP) for SL communication may be divided into RX RP and TX RP. Each RP may be signaled by a BS. All TX RPs may be connected to at least one RX RP.

An RP allocation method may be divided into a mode 1 and a mode 2. In the mode 1, a BS may indicate a resource in a specific RP. In the mode 2, a UE may select a specific RP, and may select a resource from an allocated resource pool set. For the mode 1, the UE shall be in an RRC_connected state. However, the mode 2 may operate in an RRC_idle state or an out-of-coverage state. Details thereof will be described with reference to FIG. 11.

Figure 11:
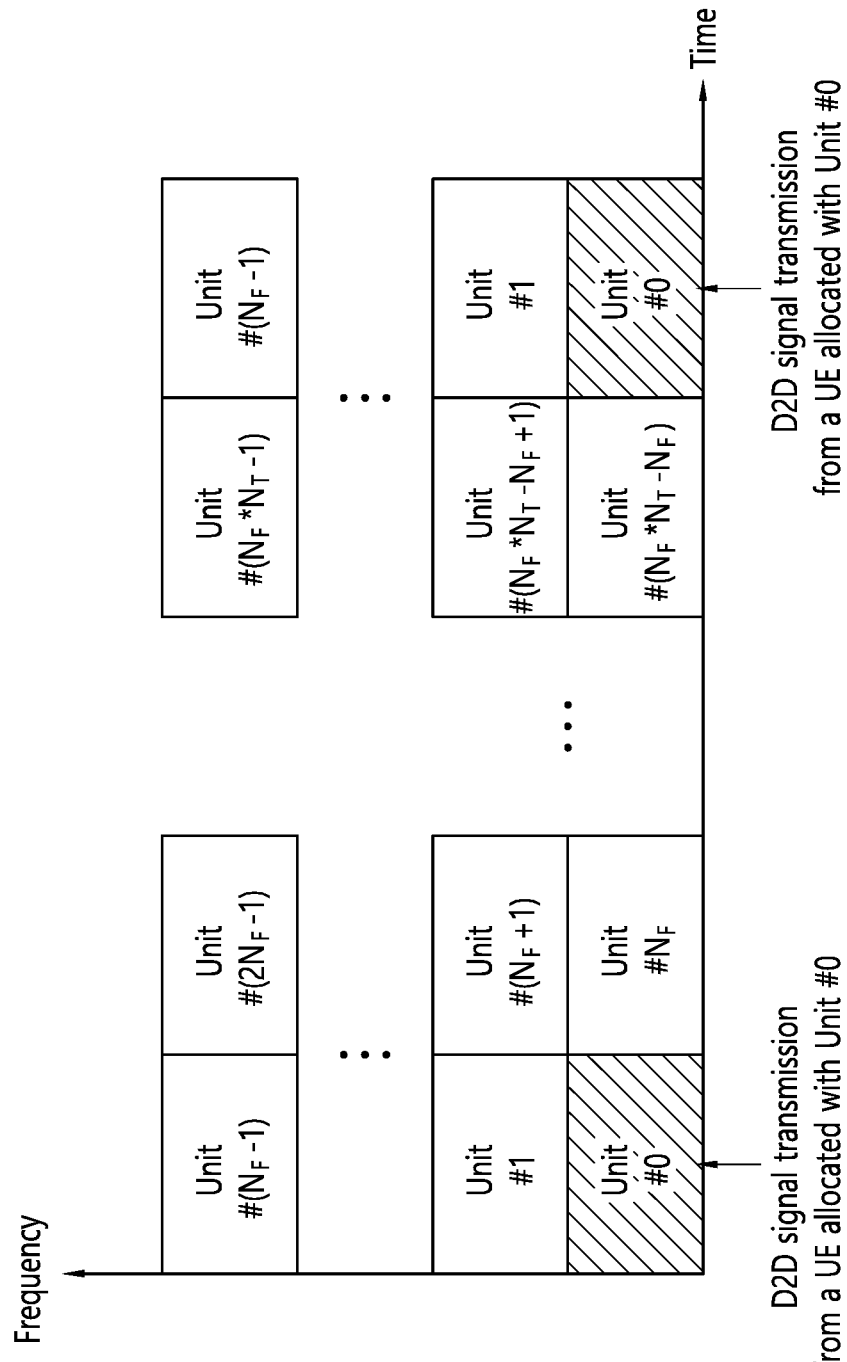
FIG. 11 shows another example of a resource pool for sidelink (SL) communication.

FIG. 11 shows another example of a resource pool for sidelink (SL) communication. The example of FIG. 11 may be used by a UE1 (i.e., transmitting UE) and UE2 (i.e., receiving UE) capable of performing communication through SL. In addition, when a network device such as an eNB transmits and receives a signal based on a communication scheme employed between UEs, the eNB may also be regarded as a kind of UE.

In the following description, the UE1 (transmitting UE) may operate to select a resource unit corresponding to a specific resource within a resource pool (RP) and to transmit a sidelink/D2D signal by using the corresponding resource unit. The UE2 (receiving UE) is configured for an RP to which the UE may transmit a signal, and detects the signal of the UE within the corresponding RP. If the UE1 is located within coverage of an eNB (i.e., in-coverage case), the RP may be informed by the eNB. Meanwhile, if the UE is located outside the coverage of the eNB (i.e., a partial coverage or out-of-coverage case), the RP may be informed by another UE or may be determined as a predetermined resource. In general, the RP consists of a plurality of resource units, and each UE may select one or more resource units to transmit its sidelink/2D signal.

FIG. 11 shows an example of a resource unit. Herein, the entire frequency resource is divided into N_F units, and the entire time resource is divided into N_T units, and thus the total number of resource units is N_F*N_T. In other words, it may be assumed that an RP of FIG. 11 is repeated with a period of N_T subframes (or other time units). That is, one resource unit may be repeated periodically as shown in FIG. 11. Alternatively, in order to obtain a diversity effect in the time and/or frequency dimension, an index of a physical resource unit to which one logical resource unit is mapped may vary based on a predetermined pattern as time elapses. In this situation, an RP for sidelink/D2D communication may imply a set of resource units which may be used for transmission by a UE (i.e., transmitting UE) intending to transmit a sidelink/D2D signal.

The aforementioned RP may be subdivided into various types. First, the RP may be classified into various types based on content of a sidelink/D2D signal transmitted in each RP. For example, the content of the D2D signal may be divided as shown below, and a separate RP (i.e., individual or different RP) may be configured for each case.

Content Example #1: Scheduling Assignment (SA) or Sidelink/D2D Control Channel

A control channel described herein is used for a signal including a resource position of a sidelink/D2D data channel transmitted by each transmitting UE in the same or succeeding time unit (e.g., subframe, TTI, slot, symbol) and control information (e.g., at least any one of MCS, MIMO transmission scheme, information element such as timing advance or the like) required to demodulate a corresponding data channel. The aforementioned signal may be transmitted together with the sidelink/D2D data by being multiplexed on the same resource unit. In this case, an SA resource pool means a pool for a resource on which SA is transmitted by being multiplexed with the sidelink/D2D data. An SA control channel may be called a sidelink/D2D control channel or the like. The SA may correspond to the PSCCH described in FIG. 9.

Content Example #2: Sidelink/D2D Data Channel

An individual resource pool (RP) may be allocated for a sidelink/D2D data channel through which a transmitting UE transmits user data by using a resource designated through scheduling assignment (SA). The sidelink/D2D data channel may correspond to the PSSCH described above in FIG. 9. If it may be transmitted together with sidelink/D2D data by being multiplexed on the same resource unit, a resource pool (RP) for the sidelink/D2D data channel may be configured to transmit only the sidelink/D2D data channel configured by excluding SA information. In other words, a resource element used to transmit SA information on an individual resource unit in an SA RP is still used in an RP of the sidelink/D2D data channel to transmit sidelink/D2D data.

Content Example #3: Discovery Channel

A transmitting UE transmits information such as its identity (ID) or the like so that a neighboring UE discovers the transmitting UE. A message used in this case is transmitted through a discovery channel or a physical sidelink discovery channel (PSDCH). An individual resource pool (RP) may be allocated for a corresponding channel.

Even if the aforementioned D2D signal carries the same content, a different resource pool (RP) may be utilized depending on a transmission and reception attributes of the D2D signal. For example, even if the same sidelink/D2D data channel or the same discovery message is transmitted, the RP may be further divided into another different RP depending on a scheme for determining transmission timing of the D2D signal (e.g., whether the D2D signal is transmitted at the time of receiving a synchronization reference signal or transmitted after a predetermined timing advance is applied at the time of receiving the synchronization reference signal), a resource allocation scheme (e.g., whether a transmission resource of an individual signal is allocated by a BS to each individual transmitting UE or whether an individual transmitting UE selects an individual signal transmission resource by itself within the resource pool), a signal format (e.g., the number of symbols occupied by each D2D signal in one subframe or the number of subframes used for transmission of one D2D signal), strength of a signal from the BS, or transmission power intensity of a D2D UE. As described above, a method in which the BS directly indicates a transmission resource of the transmitting UE in sidelink/D2D communication may be called the mode 1, and a method in which a transmission resource region is predetermined or in which the BS designates the transmission resource region and the transmitting UE directly selects a transmission resource may be called the mode 2. In case of D2D discovery, a case where the BS directly indicates a resource may be called a type 2, and a case where the UE directly selects a transmission resource from a predetermined resource region or a resource region indicated by the BS may be called a type 1.

An example of the present specification proposes a method and apparatus for solving a problem that a wireless signal cannot be received due to propagation delay or the like. Hereinafter, the problem in which a wireless signal cannot be received due to propagation delay or the like will be described.

Existing sidelink transmission is performed in a manner in which multiple wireless signals are transmitted/received through different frequency resources after synchronization is obtained by multiple UEs through a common synchronization reference. The above-described "synchronization reference" will be described in more detail below, but may be, for example, a satellite signal such as GNSS, a synchronization signal transmitted by a network entity such as a base station (eNB), or a sidelink synchronization signal (SLSS) transmitted by another UE through a sidelink. The UE obtaining synchronization through the above-described "synchronization reference" may start sidelink communication based on a symbol boundary derived from a common "synchronization reference." In addition, the receiving UE (RX UE) may acquire synchronization and set a receiver window (RX window) based on the symbol boundary set through the obtained synchronization. The receiver window may refer to a time interval in which decoding operation (e.g., a Fourier or Fast Fourier Transform (FFT) operation) is performed on a received signal in a storage such as a buffer/memory. The receiver window may correspond to a decoding operation (e.g., FFT operation) of a specific size and may correspond to, for example, a 2048 point FFT operation. In addition, the receiver window may correspond to a specific length of time (e.g., 1 ms) in a time domain. Also, the receiver window may be set to be equal to a length (e.g., the sub-frame, unit, and symbol described above).

The receiving UE may perform decoding in a manner of performing a decoding operation based on the receiver window. That is, the receiving UE may perform a decoding operation (e.g., an FFT operation) on a signal belonging to a receiver window section among all received signals and determine whether the corresponding signal is normally decoded. If the received signal is normally decoded, the receiving UE may perform an operation of transferring decoded data to a higher layer or other parts of the UE, and if the received signal is not normally decoded, the receiving UE may generate a NACK signal. That is, the receiving UE may decode the wireless signal based on the receiver window and extract a signal received from the transmitting UE through a specific frequency resource.

In a situation in which actual communication is performed, a point in time at which the transmitting UE (TX UE) starts transmission has a certain error from a symbol boundary derived from the above-described "synchronization reference". Further, an error due to propagation delay arriving from the transmitting UE (TX UE) to the receiving UE (RX UE) may be additionally applied. As a result, the wireless signal from the transmitting UE may reach the receiving UE at a different time point than the symbol boundary derived from the above-described "synchronization reference". In addition, when multiple wireless signals are received from one or multiple transmitting UEs, arrival times of each wireless signal may also be different. That is, a timing error with respect to the received signals may occur.

If the above-described timing error is maintained as an error within a cyclic prefix (CP) from the receiver window (RX window) of the receiving UE (RX UE), the receiving UE may orthogonally separate a desired signal from an unintended wireless signal through a normal decoding operation (e.g., FFT operation).

Figure 12:
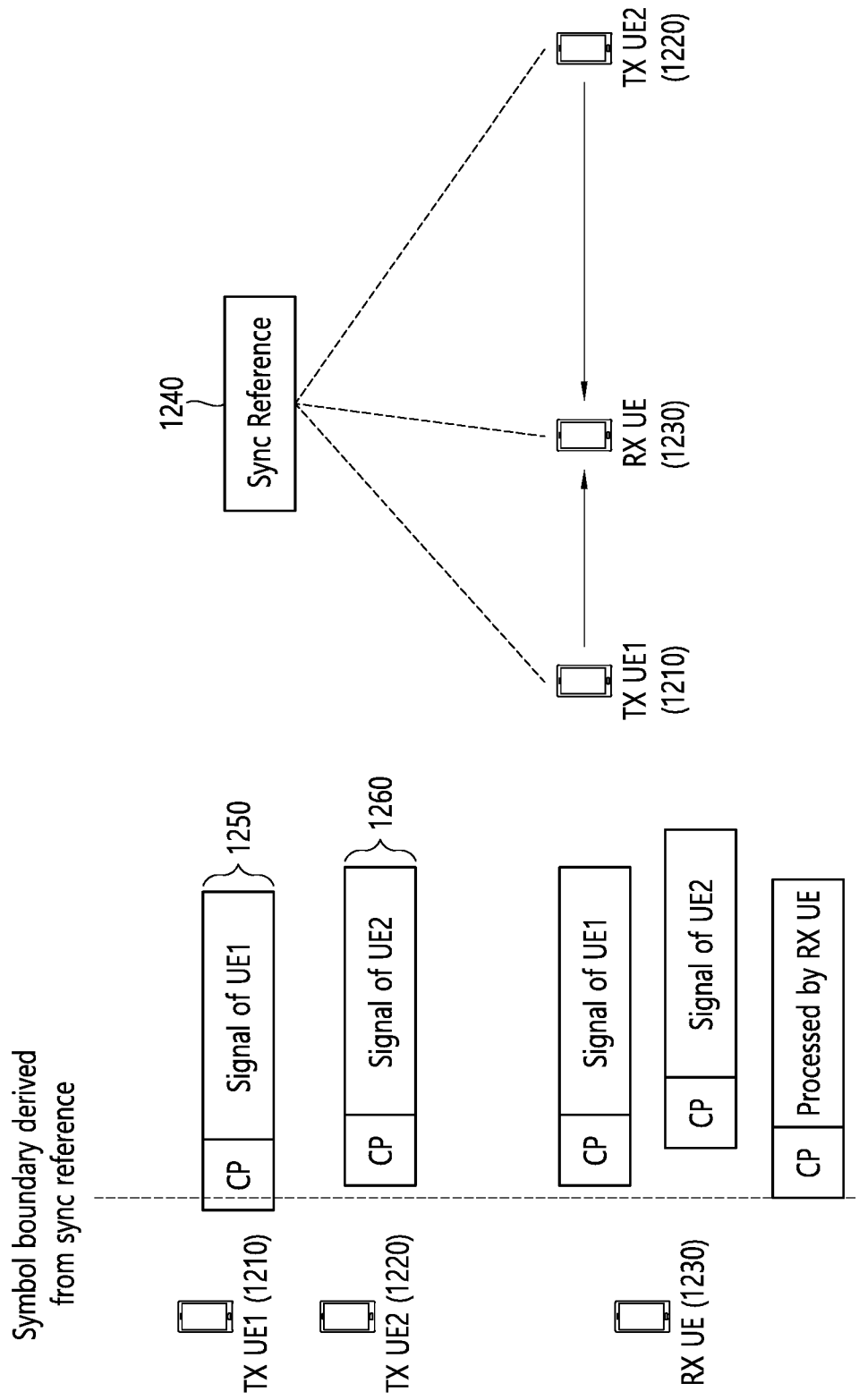
FIG. 12 shows an example in which a receiving UE decodes a wireless signal based on a receiver window.

FIG. 12 shows an example in which a receiving UE decodes a wireless signal based on a receiver window. Specifically, a transmission signal of a transmitting UE1 1210 may be positioned slightly ahead of the symbol boundary derived from the above-described "synchronization reference" and a transmission signal of a transmitting UE2 1220 may be located behind. In a state in which a TX timing error as shown in FIG. 12 occurs, signals from the transmitting UEs 1210 and 1220 may reach the receiving UE 1230 after undergoing propagation delay on a radio channel. According to FIG. 12, an arrival time error of the corresponding wireless signals is smaller than a length of a CP on a symbol boundary derived/obtained by the receiving UE 1230 from the synchronization reference 1240. In this case, even if the receiving UE 1230 discards the part corresponding to the CP and performs decoding on a subsequent part, all UE signals necessary for decoding are located in the receiver window. As a result, the UE may complete decoding for each signal by separating the transmission UE signals orthogonal to each other.

More specifically, in the example of FIG. 12, the transmitting UE1 1210, the transmitting UE2 1220, and the receiving UE 1230 may set synchronization based on the same synchronization reference 1240. Details of the synchronization reference will be described below. The symbol boundary derived from the synchronization reference 1240 is set as shown in FIG. 12, and here, since the transmitting UE1 1210 and the receiving UE 1230 are relatively close to each other and the transmitting UE2 1220 and the receiving UE 1230 are relatively away from each other, propagation delay for the first wireless signal received from the transmitting UE1 1210 to the receiving UE 1230 is relatively smaller and propagation delay for the second wireless signal received from the transmitting UE2 1220 to the receiving UE 1230 may be relatively larger. As a result, as illustrated in FIG. 12, the propagation delay for the first wireless signal 1250 is observed to be relatively small and the propagation delay for the second wireless signal 1260 is observed to be relatively large in the receiving UE 1230.

Figure 13:
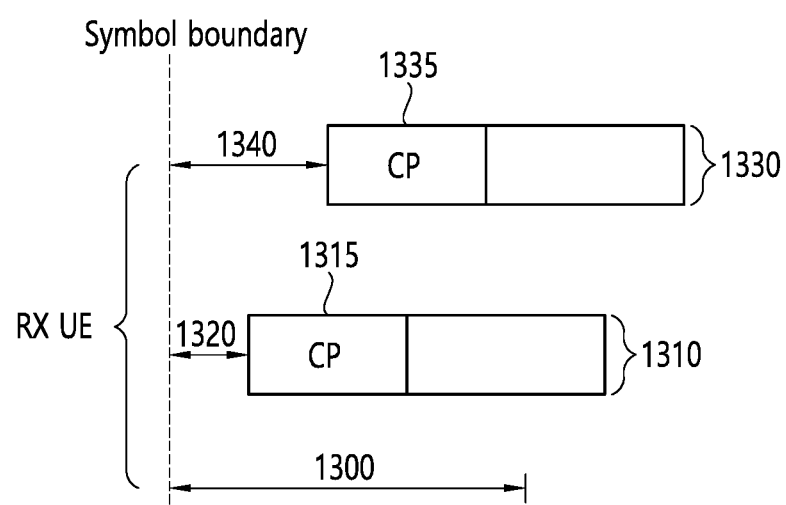
FIG. 13 is a diagram showing a relationship between a receiver window and a CP length of a wireless signal.

FIG. 13 is a diagram showing a relationship between a receiver window and a CP length of a wireless signal. A received first wireless signal 1310 may include at least one time unit (e.g., symbol), and the corresponding time unit may include a first CP 1315. If a size 1320 of propagation delay applied to the first wireless signal 1310 is shorter than the length of the first CP 1315, all information/bits of the first wireless signal 1310 are included in the receiver window 1300, and thus, the first wireless signal may be successfully decoded. However, if a size 1340 of propagation delay for a second wireless signal 1330 is longer than a length of a second CP 1335, some information/bits of the second wireless signal 1310 cannot be included in the receiver window 1300, and thus, the receiving UE may not successfully decode the second wireless signal 1330. In other words, if the difference 1320 between a start point of the symbol boundary derived from the synchronization reference and a reception time (i.e., a reception start time) of the first wireless signal is shorter than the length of the first CP 1315, it may be considered that the receiving UE has received all signals necessary for decoding. In addition, if the difference 1340 between the start point of the symbol boundary derived from the synchronization reference and the start point (i.e., the start point of reception) of the second wireless signal is short, it may be considered that the receiving UE has received all the signals necessary for decoding.

That is, the size (or length) of the propagation delay and the length of the CP are closely related, and when the CP length is set long enough, the problem of the propagation delay may be prevented. The length of the CP was generally determined according to a communication standard. In the conventional communication standard, a transmission time interval (TTI) is set relatively long, and thus, the length of the CP is also set long. That is, since the TTI applied to a wireless signal is set relatively long in the related art, the size of a time unit (e.g., symbol, subframe, slot, etc.) used to transmit/receive the wireless signal is also set to be relatively long. Accordingly, the length of the CP included in a specific time unit was also set relatively long.

However, in the above-mentioned NR standard, the length of the TTI is set shorter than in the existing standard. Accordingly, there is a high possibility that the length of the CP for a sidelink in a high frequency band, for example, in a millimeter wave (mmWave) band, is shortened. In this case, even if the transmitting UE (TX UE) transmits a wireless signal (or channel) in synchronization with a common sync reference, a timing error (e.g., a time error due to propagation delay) of the wireless signal received by the receiving UE may be greater than the length of CP. In this case, if a receiver window (RX window) is set according to the related art method and a decoding operation (e.g., FFT) is performed, decoding performance of the receiving UE may be deteriorated. For example, not all of the bits/components of a desired signal are included in one receiver window (RX window) set by the receiving UE or if an undesired signal (e.g., inter-symbol Interference) may be included therein. In addition, if multiple wireless signals or channels are received by the receiving UE in an FDM manner, orthogonality is not guaranteed for each signal/channel, causing interference (e.g., inter-carrier Interference) between multiple wireless signals/channels.

Figure 14:
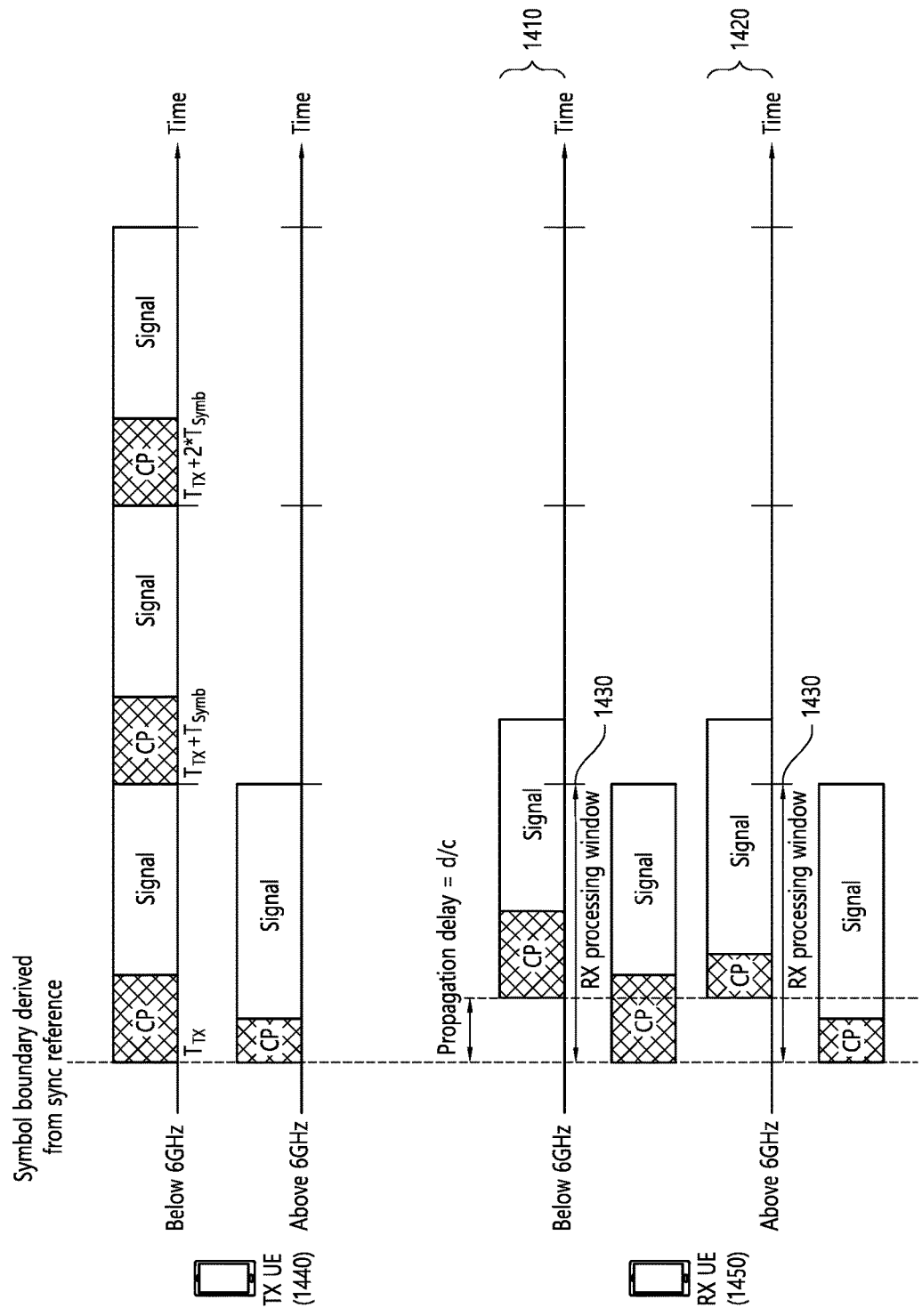
FIG. 14 is a diagram illustrating an operation of a receiving UE using one receiver window when a plurality of wireless signals are received from one transmitting UE.

FIG. 14 is a diagram illustrating an operation of a receiving UE which uses one receiver window when a plurality of wireless signals are received from one transmitting UE. According to the example of FIG. 14, the receiving UE may decode a first wireless signal 1410 and a second wireless signal 1430 through one common receiver window 1430.

Meanwhile, in the example of FIG. 14, the transmitting UE 1440 and the receiving UE 1450 may obtain synchronization through the same "synchronization reference". In addition, it is preferable that symbol boundaries obtained with the same synchronization reference are commonly applied to the first wireless signal 1410 and the second wireless signal 1420. Further, for example, the first wireless signal 1410 may be received in a first band (e.g., below 6 GHz band) and the second wireless signal 1420 may be received in a second band (e.g., above 6 GHz band). A length of a first CP applied/included in the first wireless signal may be longer than a length of the second CP applied/included in the second wireless signal. In this case, as illustrated, the same (or substantially the same) propagation delay may be applied to the first wireless signal 1410 and the second wireless signal 1420. A size of the propagation delay may be expressed as "d/e" according to a distance "d" between the transmitting UE and the receiving UE and a light speed "c".

In this case, as illustrated in FIG. 14, a problem may arise when the receiving UE 1410 attempts to decode the first wireless signal 1410 and the second wireless signal 1420 using one receiver window 1430. For example, when a start point of the receiver window 1430 is a specific time point (e.g., a start point of a symbol boundary), the length of the first CP may be set to be long enough and all bits/signals necessary for decoding may be included in the receiver window, but the length of the second CP may be set to be short so that all necessary bits/signals may not be included in the receiver window. In other words, when the second wireless signal 1420 is a high-frequency band signal including a short CP, if a symbol boundary is commonly set to the first wireless signal 1410 and the second wireless signal 1420 and a receiver window is commonly applied, reception performance may be deteriorated due to ICI and/or ISI during decoding of the second signal.

In order to improve the situation shown in FIG. 14, in the following example, a technique of using one receiver window and shifting a start point of the receiver window is proposed. Specifically, the receiving UE may obtain propagation delay applied to the first wireless signal based on the wireless signal (e.g., the first wireless signal) in which the CP length is set to be relatively long, determine a start time of the receiver window based on the obtained propagation delay, and perform decoding on the second wireless signal based on the receiver window. In other words, in addition, the receiving UE may obtain propagation delay for a plurality of wireless signals (in particular, propagation delay applied to the second wireless signal) based on one wireless signal (e.g., the first wireless signal) whose CP length is set to be relatively long. The first wireless signal and the second wireless signal may be received from the same transmitting device (a network entity including a UE or a base station), or may be received from different transmitting devices. The receiving UE may receive the first and second wireless signals based on a common synchronization reference, and a common symbol boundary may be applied.

Figure 15:
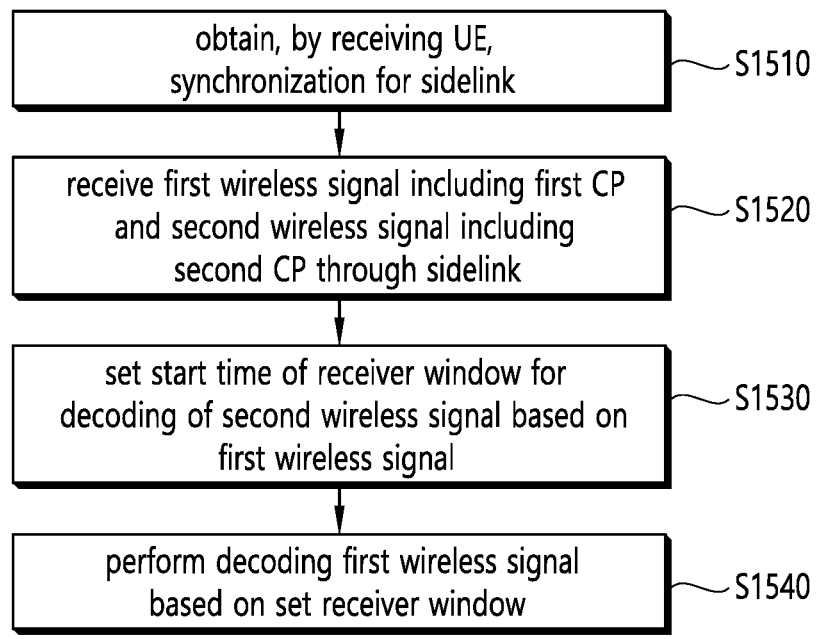
FIG. 15 is an example of a flowchart of a procedure according to an example of the present specification.

FIG. 15 is an example of a flow chart of a procedure according to an example of the present specification.

As shown, the receiving UE obtains synchronization for a sidelink (S1510).

Thereafter, the receiving UE receives a plurality of wireless signals (e.g., first/second wireless signals) through the sidelink (S1520). A first CP may be applied/included in the first wireless signal, and a second CP may be applied/included in the second wireless signal. The first wireless signal and the second wireless signal may be received simultaneously. Alternatively, the first wireless signal may be received through a first time unit (e.g., a first symbol/subframe/slot, etc.) and the second wireless signal may be received through a second time unit (e.g., a second symbol/subframe/slot, etc.) that follows the first time unit.

The receiving UE may set a start time of the receiver window for decoding the second wireless signal based on the first wireless signal (S1530). For example, the start time of the receiver window may be shifted according to the size of propagation delay applied to the first wireless signal.

According to an example of the present specification, step S1530 may be modified/omitted. For example, without shifting the start time of the receiver window, the receiving UE may transmit feedback information (e.g., timing advance information) to the transmitting UE (or transmitting device) and controls the transmitting UE to change a transmission time. Thereafter, the receiving UE may decode the second wireless signal based on the receiver window (S1540).

Each step in FIG. 15 describes the features of the example of the present specification by logically classifying them, and the order of each step illustrated in FIG. 15 is merely exemplary and the example of the present specification does not operate according to the order. For example, the operation in which the first wireless signal is received may be first performed according to step S1520, propagation delay applied to the first wireless signal may be obtained according to step S1530, a start time of the receiver window for decoding the second wireless signal may be set, and the operation of receiving the second wireless signal may be completed according to step S1520.

Hereinafter, step S1510 of FIG. 15 will be described in detail.

In step S1510, some of the synchronization-related features described below may be used. That is, the transmitting UE and the receiving UE may obtain synchronization from one "synchronization reference" according to the following method and specify a symbol boundary accordingly. The receiving UE does not need to specify different symbol boundaries for the aforementioned multiple wireless signals (first/second wireless signals). Accordingly, the time synchronization obtained by the receiving UE may be commonly applied to a plurality of wireless signals (first/second wireless signals). In an example of the present specification, "synchronization reference" may be a common one, but an example of the specification is not limited thereto. Specifically, in an example of the present specification, "synchronization references" may be different from each other. For example, UE1 according to the present specification (e.g., may be a transmitting UE or a receiving UE or may be an LTE V2X UE or an NR V2X UE like other UEs described herein) and UE2 (e.g., may be a transmitting UE or a receiving UE or LTE V2X UE or NR V2X UE like other UEs described herein) may derive symbol boundaries from different synchronization references but each symbol boundary may be determined the same. Specifically, UE1 may be a synchronization reference (sync reference) for transmitting an SLSS, which is described below, while operating based on a GNSS (or eNB, gNB, LTE UE) synchronization reference described later, in which case the synchronization reference of UE1 may be the GNSS. Meanwhile, UE2 may not obtain a GNSS signal, and in this case, UE2 may perform synchronization based on an SLSS transmitted by UE1. As a result, the synchronization reference of UE2 (i.e., the direct synchronization reference) may be UE1 operating based on GNSS (or eNB/gNB). In this case, UE1 and UE2 may be treated as having different direct synchronization references, but if UE2 successfully decodes the SLSS of the UE1, the symbol boundaries obtained by UE1 and UE2 will be the same. Accordingly, in the example of the present specification, the number of "synchronization reference" is not limited to one.

As an example of a synchronization signal for a sidelink, a sidelink synchronization signal (SLSS) may be defined, and a primary sidelink synchronization signal (PSSS) and a secondary sidelink synchronization signal (SSSS) are defined in the SLSS. Meanwhile, the physical SL broadcast channel (PSBCH) described in FIG. 9 is mapped to an SL broadcast control channel (SBCCH) that transmits a control signal for synchronization, etc., and the SLSS and PSBCH may be transmitted together or separately.

A synchronization source for the sidelink may vary depending on the state of the UEs. That is, the synchronization source may be set to be different according to whether the UE is an in coverage (INC) UE or an out-of-coverage (OCC) UE. A specific example is as follows.

Figure 16:
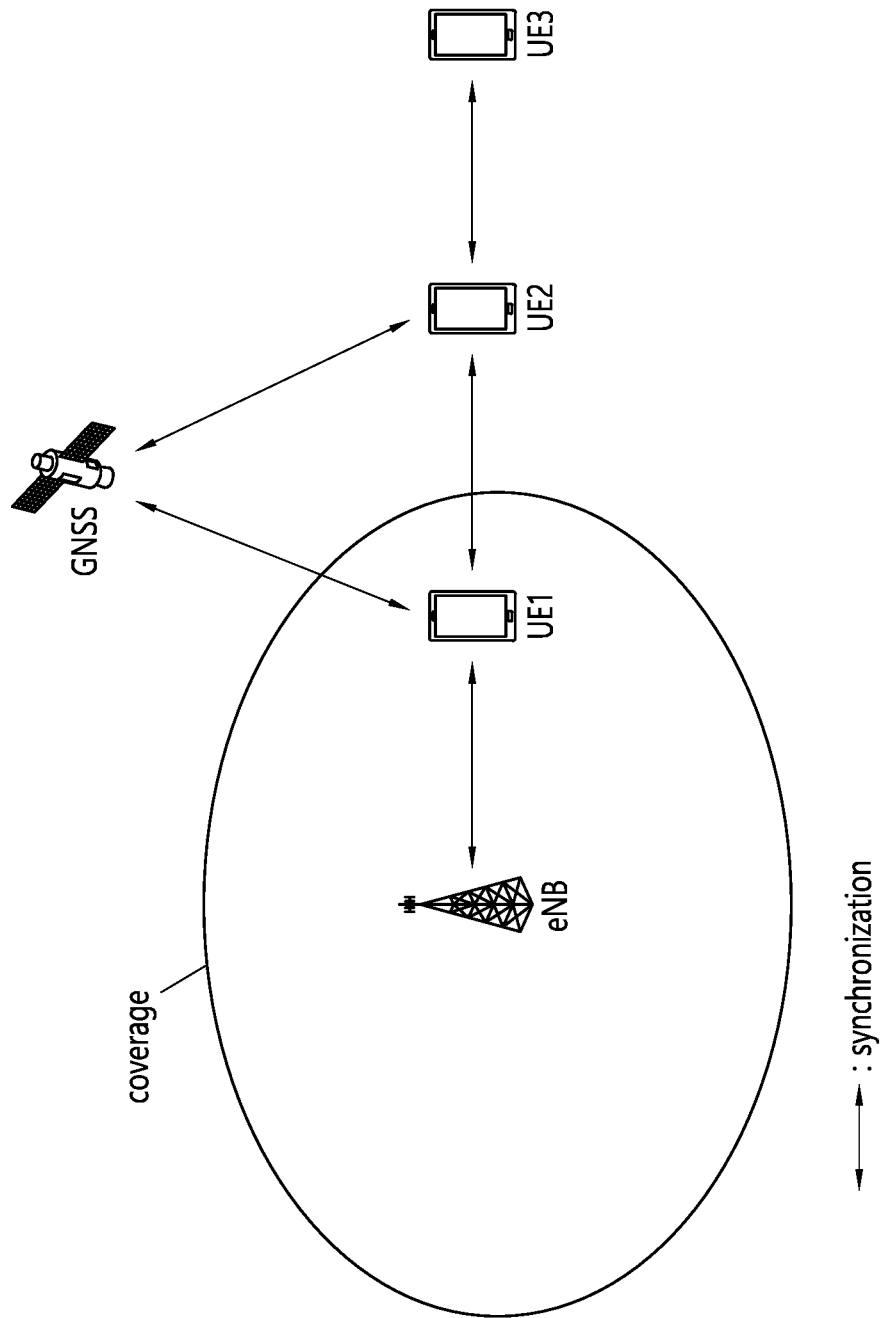
FIG. 16 is a diagram illustrating a procedure for performing synchronization in a UE.

FIG. 16 is a diagram illustrating a procedure for performing synchronization in a terminal (UE).

Referring to FIG. 16, UE 1 is a UE (INC UE) within cell coverage of a base station (eNB) and may directly receive a signal necessary for synchronization from the BS and perform synchronization with the BS. In this case, the BS may be referred to as a synchronization reference for UE 1, and UE 1 may be expressed as being directly synchronized with the BS. In addition, the UE 1 may directly receive a signal necessary for synchronization from a global navigation satellite system (GNSS) and perform synchronization with the GNSS. In this case, GNSS may be referred to as a synchronization reference for UE 1, and UE 1 may be expressed as being directly synchronized with GNSS. UE 1 may transmit SLSS and/or PSBCH for another UE after synchronization with the BS or GNSS.

UE 2 is a UE (OOC UE) located outside the cell coverage of the BS and may directly receive a signal necessary for synchronization from GNSS to perform synchronization with the GNSS. In this case, the GNSS may be referred to as a synchronization reference for UE 2. In addition, the UE 2 may perform synchronization by receiving a signal necessary for synchronization from the UE 1. UE 2 may transmit SLSS and/or PSBCH for another terminal after synchronization with the GNSS or UE 1.

UE 3 is a UE (OOC UE) located outside the cell coverage of the BS and may perform synchronization by receiving a signal required for synchronization from UE 2. UEs 1, 2, and 3 may be sidelink UEs/V2X UEs that support sidelinks.

An OOC UE such as UE 2 may perform an SLSS (/PSBCH) transmission operation, and to this end, SLSS (/PSBCH) resources may be set. Here, in the case of an OOC UE having a synchronization channel reference resource based on a global satellite navigation system (GNSS), i) an SLSS (/PSBCH) resource that receives a PSBCH (/SLSS) from another UE (e.g., an INC UE) and relays the same and ii) an SLSS (/PSBCH) resource and ii) SLSS (/PSBCH) resource that transmits the PSBCH (/SLSS) after the OOC UE (directly) selects a GNSS synchronization reference may be set (/signaled) differently (or independently) in the time domain. That is, in FIG. 16, the UE 2 receives the SLSS/PSBCH from the UE 1 and transmits/relays the SLSS/PSBCH resource, and is used when transmitting the SLSS/PSBCH after performing synchronization with the GNSS. SLSS/PSBCH resources may be configured/signaled differently or independently.

Hereinafter, step S1520 of FIG. 15 will be described in detail. According to step S1520, the receiving UE may receive a plurality of wireless signals (e.g., first/second wireless signals) through a sidelink. As described above, the plurality of wireless signals may be received from the same or different transmitting UEs.

The first wireless signal may include a first CP and the second wireless signal may include a second CP. A length of the first CP (i.e., transmission time on the time domain) may be longer than that of the second CP. Additionally or alternatively, the same/different numerology or subcarrier spacing may be applied to the first wireless signal and the second wireless signal. Additionally or alternatively, the first CP and the second CP may be derived from the same sequence having the same bit length (or different sequences having the same bit length).

In other words, a relatively long CP may be set/applied/included in the above-described first wireless signal, and the first wireless signal may be received through a first frequency band (e.g., below 6 GHz band). In contrast, a relatively short CP may be set/applied/included in the above-described second wireless signal, and the second wireless signal may be received through a second frequency band (e.g., above 6 GHz band). In summary, the first wireless signal and the second wireless signal may be classified according to the frequency band and/or the length of the CP.

Additionally or alternatively, the first wireless signal and second wireless signal described above may be classified according to contents of information transmitted by the corresponding signal. For example, the first wireless signal may be an SLSS, a PSBCH, or a PSCCH or may include a discovery channel which is periodically transmitted. For example, the second wireless signal may be a data transmission channel/signal (e.g., PSBCH). In this case, it is possible for the receiving UE to determine the number/maximum number/arrangement method/arrangement position of the plurality of receiver windows that the receiving UE sets through the first wireless signal (e.g., synchronization signal and/or control information) as described above.

In addition, the first and second wireless signals may be classified in consideration of both the corresponding CP length and the contents of the information. For example, a relatively long CP may be set/applied/included in the first wireless signal and a data transmission channel/signal transmitted in below 6 GHz band may be included therein, and a relatively short CP may be set/applied/included in the second wireless signal and a synchronization signal and/or control information transmitted in above 6 GHz band may be included therein.

The first wireless signal (or second wireless signal) may correspond to a first radio channel (or second radio channel) received through a specific cell or a bandwidth part (BWP). Further, the first wireless signal (or second wireless signal) may correspond to a predetermined number of subcarriers and may be referred to as a first carrier (or a second carrier).

Hereinafter, step S1530 of FIG. 15 will be described. According to step S1530, the receiving UE may set a start time of a receiver window for decoding the second wireless signal based on the first wireless signal. Specifically, the receiving UE may obtain propagation delay for a plurality of wireless signals (especially, propagation delay applied to the second wireless signal) based on one wireless signal (e.g., the first wireless signal) whose CP length is set to be relatively long.

Figure 17:
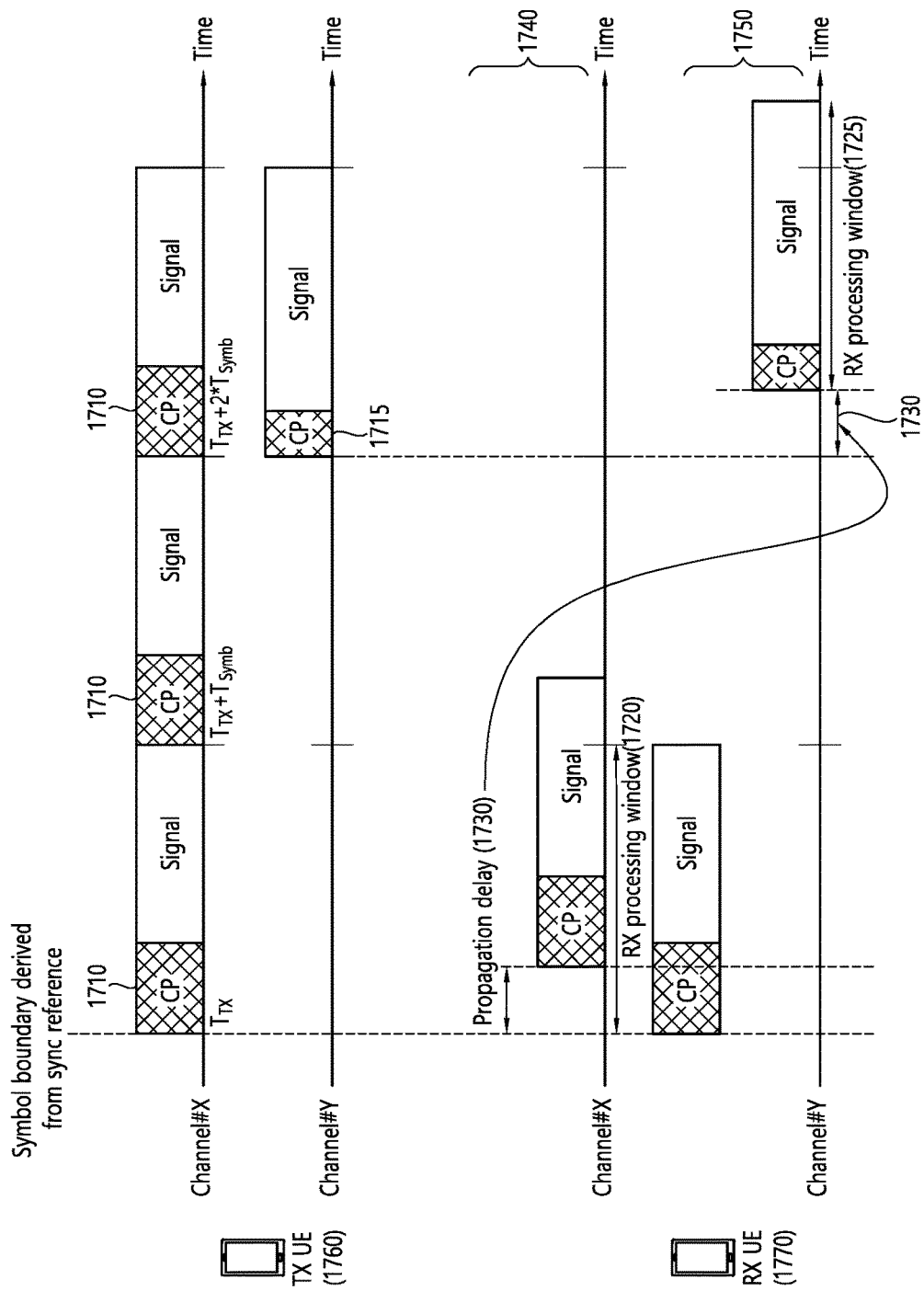
FIG. 17 is a diagram showing an example of obtaining propagation delay through one of a plurality of wireless signals and controlling a start point of a receiver window.

FIG. 17 is a diagram illustrating an example of obtaining propagation delay through one of a plurality of wireless signals and controlling a start time of a receiver window. The example of FIG. 17 relates to an operation of receiving channel X (channel #X) and channel Y (channel #Y). The channel X shown in FIG. 17 corresponds to the first wireless signal described above, and the channel Y shown in FIG. 17 corresponds to the second wireless signal described above. In the example of FIG. 17, a first wireless signal 1740 may be received in a preceding time unit (e.g., symbol/subframe/slot, etc.) and the second wireless signal 1750 may be received in a following time unit (e.g., a symbol/subframe/slot, etc.), but an example of the present specification is not limited thereto.

The receiving UE 1770 may obtain synchronization from a synchronization reference and set a symbol boundary. The symbol boundary may be commonly applied to the first wireless signal 1740 and the second wireless signal 1750. As described above, a length of the first CP 1710 applied/included in the first wireless signal 1740 may be set to be longer than a length of the second CP 1715 applied/included in the second wireless signal 1750.

The receiving UE 1770 may perform decoding on the first wireless signal 1740 based on one receiver window 1720, in which case a start time of the receiver window 1720 may be the same as a start point of the symbol boundary. Since the first CP 1710 is set to be sufficiently large, the receiving UE 1770 may perform normal decoding on the first wireless signal 1740 even if the propagation delay 1730 is applied to the first wireless signal 1740.

The receiving UE 1770 may acquire/calculate/estimate a size of the propagation delay 1730 applied to the first wireless signal 1740 in the process of decoding the first wireless signal 1740. A specific technique for obtaining/calculating/estimating the propagation delay 1730 will be further described below.

The receiving UE 1770 may shift the start time of the initial receiver window 1720 based on the size of the propagation delay 1730. For example, a receiver window 1725 may be set to be shifted from the start point of the initial receiver window 1720 by the size of the propagation delay 1730. The receiving UE 1770 may decode the second wireless signal 1750 based on the newly set receiver window 1725.

Hereinafter, for convenience of description, the initial receiver window 1720 of FIG. 17 may be expressed as a "receiver window 1720 for the first wireless signal," and the newly set/shifted receiver window 1725 of FIG. 17 may be expressed as a "receiver window 1725 for the second wireless signal".

The first wireless signal 1740 and the second wireless signal 1750 of FIG. 17 may be classified according to at least one of a frequency band, a CP length, and contents in which the wireless signal is transmitted, as described above.

For example, the first wireless signal 1740 may be expressed as a signal/channel/carrier including a longer CP than the second wireless signal 1750. Since the first CP 1710 included/applied to the first wireless signal 1740 is longer, orthogonality between channels/signals may be maintained as much as possible. Through such orthogonality, ISI between channels/signals may be overcome, while alleviating (or eliminating) ICI. In addition, the receiver window 1725 for the second wireless signal is controlled based on information (e.g., information regarding the size of the propagation delay) obtained/estimated/calculated through the first wireless signal 1740. Specifically, the receiving UE 1770 may eliminate/alleviate ICI compared to the related art, by controlling a timing (i.e., the start time of the window) of the receiver window 1725 for the second wireless signal.

Additionally or alternatively, the first wireless signal 1740 may be expressed as a signal/channel/carrier transmitted in a lower frequency band than the second wireless signal 1750. Specifically, the first wireless signal 1740 may be expressed as a signal/channel/carrier transmitted in a band below 6 GHz, and the second wireless signal 1750 may be expressed as a signal/channel/carrier in a band above 6 GHz.

Additionally or alternatively, the first wireless signal 1740 may be SLSS, PSBCH, or PSCCH or may be expressed as a discovery channel which is periodically transmitted. Also, the second wireless signal 1740 may be expressed as a signal/channel (e.g., PSSCH) for data transmission. Accordingly, the receiving UE 1770 obtains a synchronization signal and/or a control information signal through the first wireless signal 1740 and control a timing (start time of the window) of the receiver window 1725 for the second wireless signal based on the obtained/estimated/calculated information (e.g., the size of the propagation delay). Through this, the receiving UE 1770 may improve reception performance for a data channel/signal.

Additionally or alternatively, in order to adjust the timing of the receiver window for the second wireless signal as a data channel based on timing gap information obtained based on the first wireless signal as the control channel, a time gap between the first wireless signal and the second wireless signal may be required. Accordingly, the first wireless signal may be a control channel for scheduling, and the second wireless signal may be used to perform HARQ retransmission and/or transfer channel/beam related status information (e.g., CQI, PMI, CRI, RI, etc.) for a data channel through a high frequency band of 6 GHz or higher.

Additionally or alternatively, the first wireless signal 1740 may include a plurality of first subchannels (e.g., 1A, 1B, and 1C channels). Also, the second wireless signal 1750 may include a plurality of second subchannels (e.g., 2A, 2B, and 2C channels). The numbers of the first and second subchannels may be the same or different. The first and/or second subchannels may be received from the same transmitting UE or may be received from different transmitting UEs. In this case, the receiving UE 1770 may individually acquire/calculate/estimate the size of the propagation delay for the plurality of first subchannels and may control timings of the plurality of receiver windows (i.e., the start times of the windows) based thereon. For example, the receiving UE 1770 may adjust a timing (i.e., a start time of the window) of the receiver window of the 2A channel corresponding to the 1A channel. In addition, the receiving UE 1770 may adjust the timing of the receiver window of the 2B channel corresponding to the 1B channel based on a second propagation delay obtained through the 1B channel and adjust a timing of the receiver window of the 2C channel corresponding to the 1C channel based on the propagation delay obtained through the 1C channel. In addition, the receiving UE 1770 may calculate an average of the first, second, and third propagation delays described above (or an average obtained by adding a weight value to a specific propagation delay) and set one or a plurality of receiver windows in which the start time is shifted based on the average value. In addition, the receiving UE 1770 may commonly determine a start time of a plurality of receiver windows (or a specific group of receiver windows) based only on propagation delay for one received signal/channel. In this case, if a plurality of receiver windows are set, the amount of FFT operation may increase.

Meanwhile, as described above, step S1530 may be modified/omitted. Specifically, the receiving UE 1770 may indicate a timing advance (TA) value to the transmitting UE 1760. For example, the receiving UE 1770 may adjust a transmission timing (TX timing) by transmitting the propagation delay obtained/calculated/estimated based on the first wireless signal 1740 to the transmitting UE 1760. Specifically, the transmitting UE may obtain a timing gap between an arrival time of an actual signal and a symbol boundary based on the first wireless signal 1740 and feedback information on the obtained timing gap to the transmitting UE 1760. When transmitting the second wireless signal 2150, the transmitting UE 1760 may adjust a transmission time based on the feedback information. Through this, even if the receiving UE 1770 does not shift the start time of the receiver window, it may be possible to transmit a transmission signal within the receiver window. The above-described TA value may be obtained from the first wireless signal 1740 but may also be obtained from other wireless signals. That is, one TA value (or an offset value or a differential value derived from a previously agreed/signaled TA value) may be fed back based on an average value (or a weighted average value) of timing gaps obtained from different wireless signals or a TA value individually set for each wireless signal may be fed back.

As described above, the receiving UE 1770 may acquire/calculate/estimate a size of a propagation delay 2130 applied to the first wireless signal 1740 in the process of decoding the first wireless signal 1740. Hereinafter, additional technical features related to the operation of obtaining/calculating/estimating the size of the propagation delay 1730 will be described.

As described above, the receiving UE according to the embodiment of FIG. 17 may obtain information from the first wireless signal 1740 for the receiver window 1725 for the second wireless signal 1750. An example of such information may include information on an arrival time of a received signal which is actually received through the first wireless signal 1740 and/or information on a timing gap between an arrival time of an actual received signal and an OFDM symbol boundary.

Figure 18:
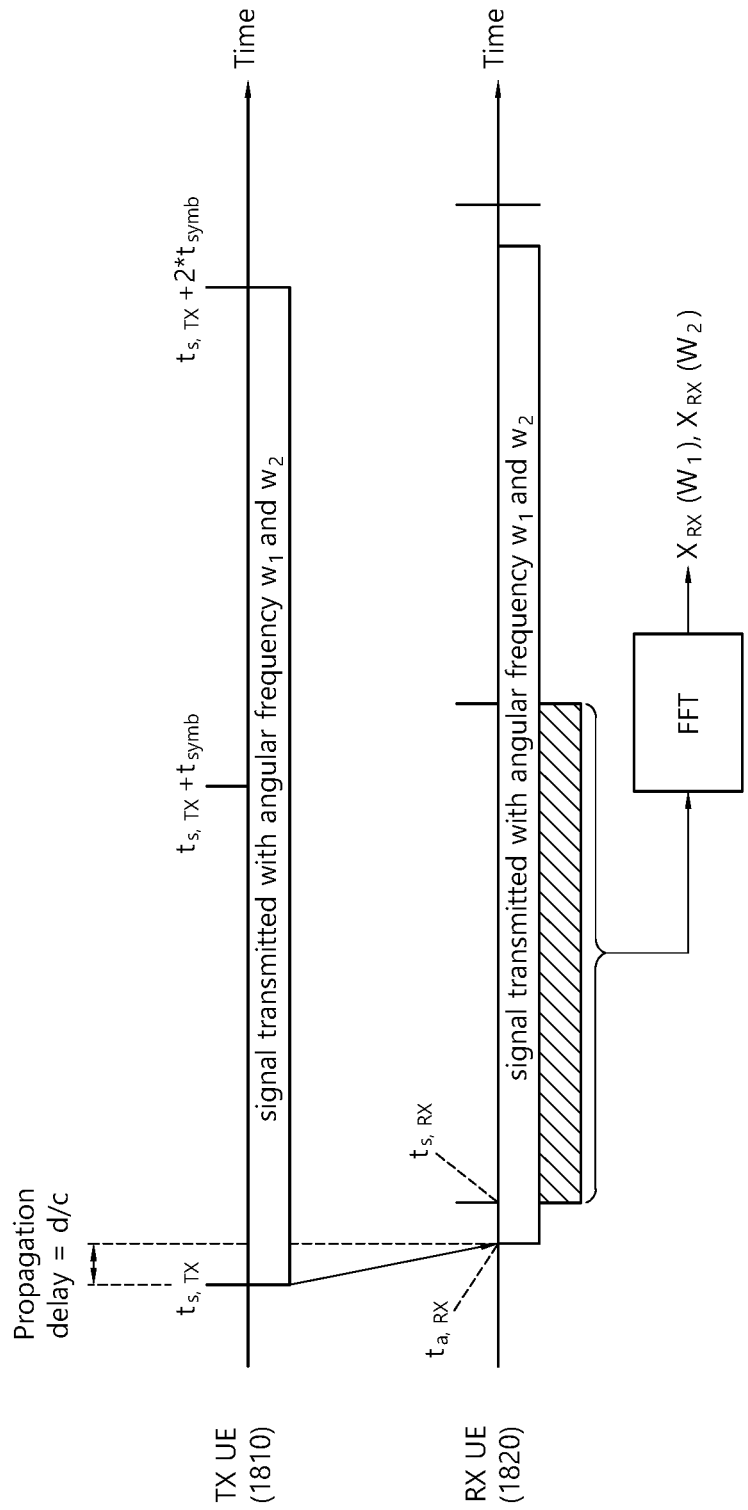
FIG. 18 is a diagram showing an example of a technique for measuring a distance between a transmitting device and a receiving device.

FIG. 18 is a diagram showing an example of a technique for measuring a distance between a transmitting device and a receiving device. The example of FIG. 18 will be described in more detail below.

A meaning of the timing gap between the actual arrival time of the received signal and the symbol boundary (OFDM symbol boundary) will be described with reference to FIG. 18 as follows. It may be assumed that a timing at which the transmitting UE 1810 and the receiving UE 1820 perform transmission/reception operation is quantized. In addition, it may be interpreted that a boundary point of each OFDM symbol in transmission/reception based on OFDM is a quantized point at which transmission and reception operation is performed. In this case, as illustrated in FIG. 18, it may be assumed that start times of the transmission/reception operations of the transmitting UE 1810 and the receiving UE 1820 may be $t_{s,TX}$ and $t_{s,RX}$, respectively, and repeatedly appear at every $t_{symb}$ (length of OFDM symbol). Assuming that the distance between the receiving UE 1820 and the transmitting UE 1810 is d, the signal transmitted by the transmitting UE at $t=t_{s,TX}$, may arrive at the receiving UE at a time point of $t=t_{a,RX}=t_{s,TX}+d/c$ (c is a speed of light). The timing gap between the actual arrival time of the received signal and the symbol boundary (OFDM symbol boundary) may be interpreted as corresponding to the value of $t_{s,RX}-t_{a,RX}$ in FIG. 18.

Meanwhile, the receiving UE according to the present specification measures the distance to the transmitting UE and obtain propagation delay between the transmitting UE and the receiving UE by dividing the distance by a speed of light. The obtained propagation delay may be used to shift the receiver window 1725 for the second wireless signal 1750 or feed back a timing advance (TA) to the transmitting UE. Hereinafter, a method of measuring the distance will be described with reference to FIG. 18.

When a wireless signal transmitted at a specific point with an angular frequency ω is observed at a time t from a point x away from a transmission point, the observed signal is expressed by the following equation.

$$E(w,t,x)=A(x)*\exp(j*(w*t-k*x+\phi))$$ [Equation 1]

In the equation, A refers to an amplitude of the wireless signal at the corresponding location, k is a variable that satisfies the condition of $$k = \frac{w}{c},$$

and c refers to the speed of light.

FIG. 18 is a diagram showing operations in a transmitting device 1810 and a receiving device 1820. The transmitting device is a device that transmits a transmission signal for distance measurement, and the receiving device is a device that receives the corresponding transmission signal, processes the signal, and then transmits the received signal generated by the receiving device to the transmitting device. The example of FIG. 18 relates to a technique in which the transmitting device measures a distance between the transmitting device and the receiving device through the received signal.

In the following example, it is assumed that a time point at which the transmitting device and the receiving device transmit and receive signals is quantized. For example, when signals are transmitted and received based on OFDM, a boundary point of each OFDM symbol is a quantized time point for performing transmission and reception operations. For convenience, it is assumed that the transmission/reception operations of the transmitting device and the receiving device start from $t_{s,TX}$ and $t_{s,RX}$, respectively, and repeatedly appear they at every $t_{symb}$, and in the case of OFDM, $t_{symb}$ may be a length of an OFDM symbol.

The transmitting device is located at x=0 and transmits a distance measurement signal (i.e., a transmission signal) through two frequencies w1 and w2 at $t=t_{s,TX}$. Here, the initial phases of the two frequency components of the transmission signal may be set to be the same or the phases may be set to be different by a predetermined value. Hereinafter, an example in which the initial phases are the same will be described for convenience of description. In this case, the transmission signal observed at the location of the transmitting device is expressed as follows.

$$E(w_1, t, x=0) = A(0)*\exp(j*(w_1*(t-t_{s,TX})+\phi)),$$

$$E(w_2, t, x=0) = A(0)*\exp(j*(w_2*(t-t_{s,TX})+\phi)) \quad \text{[Equation 2]}$$

It is assumed that the receiving device is d away from the transmitting device. A signal transmitted by the transmitting device at $t=t_{s,TX}$ arrives at the receiving device at a time point of $t=t_{a,RX}=t_{s,TX}+d/c$. The signal observed by the receiving device is expressed as follows.

$$E(w_1, t, x=d) = A(d)*\exp(j*(w_1*t - w_1*t_{s,TX} - k_1*d + \phi)),$$

$$E(w_2, t, x=d) = A(d)*\exp(j*(w_2*t - w_2*t_{s,TX} - k_2*d + \phi)) \quad \text{[Equation 3]}$$

As in the previous assumption, it is assumed that the time point at which the receiving device may actually start processing the transmission signal (e.g., the OFDM processing time at the receiving device) is quantized and the above signal is processed at $t=t_{s,RX}$. In the example of FIG. 18, it is assumed that OFDM processing using a fast Fourier transform (FFT) is performed, and a form of multiplying sinusoidal signals of various frequencies appearing in multiples of a fundamental frequency with initial phase=0 at $t=t_{s,RX}$ and adding the same appears. In this case, only the case where the sinusoidal signal of the same frequency as the frequency of the received signal is multiplied in terms of the nature of the FFT remains, and in the case of being multiplied with the remaining frequency, 0 is obtained in the adding process. According to such attributes of FFT operation/processing, the value $X_{RX}(w_1)$ obtained by the receiving device for the frequency WI component as a result of FFT is expressed by the following equation.

$$\begin{aligned}
X_{RX}(w_1) &= E(w_1, t, x=d) * \exp(-j*w_1(t - t_{s,RX})) \quad \text{[Equation 4]} \\
&= A(d)*\exp(j*(w_1*t - w_1*t_{s,TX} - \\
&\quad k_1*d - w_1*t + w_1*t_{s,RX} + \phi)) \\
&= A(d)*\exp(j*(w_1*t_{s,RX} - \\
&\quad w_1*t_{s,RX} - k_1*d + \phi)) \\
&= A(d)*\exp(j*(w_1(t_{s,RX} - t_{a,RX}) + \phi))
\end{aligned}$$

The FFT operation/processing described above is applied in the same manner to the frequency $w_2$ component, and the resultantly obtained value is expressed as follows.

$$X_{RX}(w_2) = A(d)*\exp(j*(w_2(t_{s,RX} - t_{a,RX}) + \phi)) \quad \text{[Equation 5]}$$

The receiving device may compare the two values ($X_{RX}(w_1)$, $X_{RX}(w_2)$) obtained through the above equation as follows.

$$\frac{X_{RX}(w_2)}{X_{RX}(w_1)} = \exp(j*(w_2 - w_1)(t_{s,RX} - t_{a,RX})) \quad \text{[Equation 6]}$$

Since the frequencies w1, w2 of the transmission signal are values known to the transmitting device and the receiving device, the receiving device may calculate $t_{s,RX} - t_{a,RX}$ through Equation 6. Since $t_{s,RX}$ indicates a time point at which the distance measurement signal is actually received by the receiving device and $t_{a,RX}$ indicates a time point at which OFDM processing is performed by the receiving device, the receiving device may resultantly calculate a difference between a time point at which OFDM processing started and an actual time point at which the signal was received.

Through this, even if the receiving device performs OFDM processing only at a specific quantized time point, the receiving device may calculate a time at which a signal transmitted by a specific transmitting device actually arrives through proper phase calculation. In particular, this part is helpful in the process of transmitting a signal using different frequencies by several devices, and the receiving device may recognize a reception time point of an individual signal through a following simple phase calculation even though only a single FFT operation is performed on a signal in which all signals overlap at a still quantized specific time point.

Hereinafter, step S1540 of FIG. 15 will be described in detail. According to step S1540, the receiving UE may decode at least one wireless signal including the second wireless signal through a receiver window (or a receiver window that does not require shifting due to TA information) to which shifting is applied according to step S1530. As described above, the receiver window may correspond to a decoding operation of a specific size (e.g., FFT operation) and may correspond to, for example, a 2048 point FFT operation. Also, the receiver window may correspond to a specific length of time (e.g., 1 ms) in the time domain. Also, the receiver window may be set equal to the length of a specific time unit (e.g., subframe/unit/symbol).

Hereinafter, an example of a UE (transmitting or receiving UE) in this specification will be described.

Figure 19:
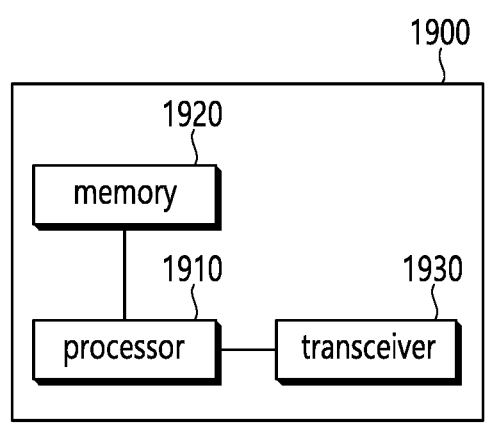
FIG. 19 is a diagram of a UE to which an example of the present specification is applied.

FIG. 19 shows an example of a UE to which an example of the present specification is applied.

Referring to FIG. 19, a UE 1900 includes a processor 1910, a memory 1920, and a transceiver 1930. The illustrated processor, memory, and transceiver may each be implemented as a separate chip, or at least two or more blocks/functions may be implemented through one chip.

The illustrated transceiver 1930 performs a signal transmission/reception operation. Specifically, the transceiver 1930 performs an operation of receiving first and second wireless signals. In addition, the transceiver 1930 may perform a decoding operation (e.g., FFT operation) based on a receiver window set by the processor 1910. To this end, the transceiver 1930 may include a receiver window controller (not shown) that extracts a part of the received signal and a decoding operation processor (not shown) that performs a decoding operation on the signal extracted through the receiver window.

The processor 1910 may implement the functions, processes, and/or methods proposed herein. Specifically, the processor 1910 may determine the number/arrangement of the receiver windows for the second wireless signal based on the first wireless signal obtained through the transceiver 1930, and delivers the determined information to the transceiver 1930.

The processor 1910 may include an application-specific integrated circuit (ASIC), other chipsets, logic circuits, and data processing devices. The memory 1920 may include a read-only memory (ROM), a random access memory (RAM), a flash memory, a memory card, a storage medium, and/or other storage devices.

Figure 20:
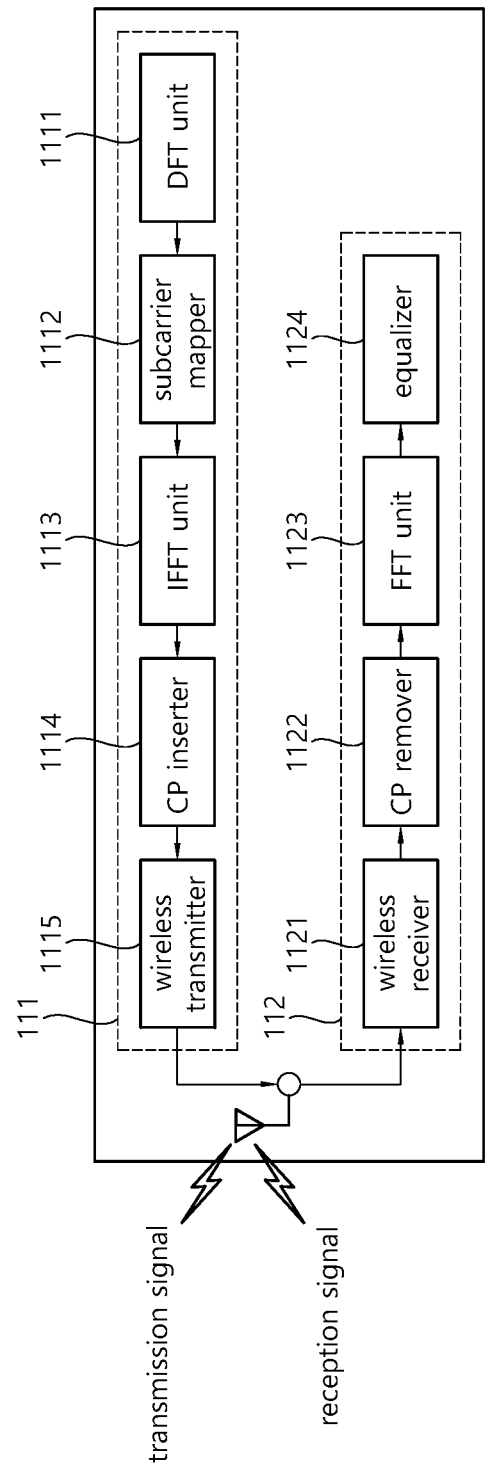
FIG. 20 shows another example of a detailed block diagram of a transceiver.

FIG. 20 shows another example of a detailed block diagram of a transceiver. Referring to FIG. 20, the transceiver 110 includes a transmitting part 111 and a receiving part 112. The transmitting part 111 includes a Discrete Fourier Transform (DFT) unit 1111, a subcarrier mapper 1112, an IFFT unit 1113, a CP inserter 1144, and a wireless transmitter 1115. The transmitting part 111 may further include a modulator. In addition, the transmitting part may further include, for example, a scramble unit (not shown), a modulation mapper (not shown), a layer mapper (not shown), and a layer permutator (not shown), and this may be disposed before the DFT unit 1111. That is, in order to prevent an increase in peak-to-average power ratio (PAPR), the transmitting part 111 allows information to pass through the DFT unit 1111 before mapping a signal to a subcarrier. A signal spread (or precoded) by the DFT unit 1111 is subcarrier-mapped through the subcarrier mapper 1112 and generated as a signal on a time axis through the IFFT unit 1113.

The DFT unit 1111 performs DFT on input symbols to output complex-valued symbols. For example, if Ntx symbols are input (where Ntx is a natural number), a DFT size (size) is Ntx. The DFT unit 1111 may be referred to as a transform precoder. The subcarrier mapper 1112 maps the complex-valued symbols to each subcarrier of a frequency domain. The complex-valued symbols may be mapped to resource elements corresponding to a resource block allocated for data transmission. The subcarrier mapper 1112 may be referred to as a resource element mapper. The IFFT unit 1113 performs IFFT on an input symbol to output a baseband signal for data, which is a time domain signal. The CP inserter 1114 copies a part of a rear portion of the base band signal for data and inserts it into a front portion of the base band signal for data. Inter-symbol Interference (ISI) and inter-carrier Interference (ICI) are prevented through CP insertion, so that orthogonality may be maintained even in a multi-path channel.

Meanwhile, the receiving part 112 includes a wireless receiver 1121, a CP remover 1122, an FFT unit 1123, and an equalizer 1124. The wireless receiver 1121, the CP remover 1122, and the FFT unit 1123 of the receiving part 112 perform reverse functions of the wireless transmitter 1115, the CP inserter 1114, and the IFFT unit 1113 of the transmitting part 111. The receiving part 112 may further include a demodulator.

In addition to the illustrated block, the transceiver of FIG. 20 may include a receiver window controller (not shown) for extracting a portion of a received signal, and a decoding operation processing unit for performing a decoding operation on the signal extracted through the receiver window (not shown).

What is claimed is:

1. A method for sidelink by a first user equipment (UE), the method comprising:
    selecting, by the first UE, a synchronization reference for the sidelink, wherein the synchronization reference includes a global navigation satellite system (GNSS), a base station (BS), or a UE;
    performing, by the first UE, a synchronization procedure for obtaining synchronization for the sidelink, based on a synchronization signal received from the selected synchronization reference for the sidelink,
    wherein the synchronization signal is one of (i) a primary synchronization signal (PSS), a secondary synchronization signal (SSS), or a physical broadcast channel (PBCH) from the BS, (ii) a sidelink primary synchronization signal (S-PSS), a sidelink secondary synchronization signal (S-SSS), or a physical sidelink broadcast channel (PSBCH) from the UE, or (iii) a signal from the GNSS;
    receiving, by the first UE, a first wireless signal and a second wireless signal through the sidelink, wherein a first cyclic prefix (CP) is included in the first wireless signal and a second CP is included in the second wireless signal;
    obtaining, by the first UE, a propagation delay applied to the first wireless signal;
    setting, by the first UE, a start time of a receiver window for decoding of the second wireless signal based on the obtained propagation delay; and
    performing, by the first UE, decoding on the second wireless signal based on the receiver window.

2. The method of claim 1, wherein the first wireless signal is received through a low frequency band, the second wireless signal is received through a high frequency band, and a length of the first CP is set to be longer than a length of the second CP on a time domain.

3. The method of claim 1, wherein the first wireless signal comprises scheduling information for the second wireless signal, and the second wireless signal comprises user data for the first UE.

4. The method of claim 1, wherein the first wireless signal is received in a first time unit.

5. The method of claim 1, wherein the first UE obtains a distance to a transmitting UE based on the first wireless signal and obtains the propagation delay applied to the first wireless signal based on the obtained distance.

6. The method of claim 1, wherein the receiver window defines a time interval in which fast Fourier transform (FFT) operation is performed on the second wireless signal.

7. The method of claim 1, wherein the first UE is configured to communicate with at least one of a transmitting UE, a wireless communication server, and/or an autonomous vehicle.

8. A first user equipment (UE) for sidelink, the first UE comprising:
a transceiver configured to obtain a reception signal through the sidelink; and
a processor connected to the transceiver and configured to control the transceiver,
wherein the processor selects a synchronization reference for the sidelink, wherein the synchronization reference includes global navigation satellite system (GNSS), a base station (BS), or a UE,
wherein the processor performs a synchronization procedure for obtaining synchronization for the sidelink by controlling the transceiver, based on a synchronization signal received from the selected synchronization reference for the sidelink,
wherein the synchronization signal is one of (i) a primary synchronization signal (PSS), a secondary synchronization signal (SSS), or a physical broadcast channel (PBCH) from the BS, (ii) a sidelink primary synchronization signal (S-PSS), a sidelink secondary synchronization signal (S-SSS), or a physical sidelink broadcast channel (PSBCH) from the UE, or (iii) a signal from the GNSS,
wherein the processor receives a first wireless signal and a second wireless signal through the sidelink by controlling the transceiver, wherein a first cyclic prefix (CP) is included in the first wireless signal and a second CP is included in the second wireless signal,
wherein the processor obtains a propagation delay applied to the first wireless signal,
wherein the processor sets a start time of a receiver window for decoding the second wireless signal based on the obtained propagation delay, and
wherein the processor performs decoding on the second wireless signal based on the receiver window by controlling the transceiver.

9. The first UE of claim 8, wherein the first wireless signal is received through a low frequency band, the second wireless signal is received through a high frequency band, and a length of the first CP is set to be longer than a length of the second CP on a time domain.

10. The first UE of claim 8, wherein the first wireless signal comprises scheduling information for the second wireless signal, and the second wireless signal comprises user data for the first UE.

11. The first UE of claim 8, wherein the first wireless signal is received in a first time unit.

12. The first UE of claim 8, wherein the processor obtains a distance to a transmitting UE based on the first wireless signal and obtains the propagation delay applied to the first wireless signal based on the obtained distance.

13. The first UE of claim 8, wherein the receiver window defines a time interval in which fast Fourier transform (FFT) operation is performed on the second wireless signal.

14. The first UE of claim 8, wherein the transceiver is further configured to communicate with at least one of a transmitting UE, a wireless communication server, and/or an autonomous vehicle.

* * * * *